United States Patent
Lin et al.

(10) Patent No.: US 12,229,262 B2
(45) Date of Patent: Feb. 18, 2025

(54) SECURITY THREAT DETECTION USING COLLABORATIVE INTELLIGENCE

(71) Applicant: International Business Machines Corporation, Armonk, NY (US)

(72) Inventors: June-Ray Lin, Taipei (TW); Narayana Aditya Madineni, Ferny Hills (AU)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 341 days.

(21) Appl. No.: 17/934,640

(22) Filed: Sep. 23, 2022

(65) Prior Publication Data

US 2024/0104207 A1   Mar. 28, 2024

(51) Int. Cl.
*G06F 21/56* (2013.01)
*G06N 7/01* (2023.01)

(52) U.S. Cl.
CPC ............. *G06F 21/566* (2013.01); *G06N 7/01* (2023.01); *G06F 2221/034* (2013.01)

(58) Field of Classification Search
CPC . H04L 63/1416; H04L 63/1433; H04L 63/20; G06F 21/577; G06F 21/6254; G06F 21/566; G06F 2221/034; G06N 7/01
See application file for complete search history.

(56) References Cited

U.S. PATENT DOCUMENTS

| 10,922,407 B2 | 2/2021 | Lin et al. |
| 11,017,083 B2 | 5/2021 | Wu et al. |
| 12,050,522 B2 * | 7/2024 | Cepek ................. G06N 3/045 |
| 2017/0213156 A1 | 7/2017 | Hammond et al. |
| 2018/0034842 A1 * | 2/2018 | Smyth ................. G06F 21/577 |

(Continued)

OTHER PUBLICATIONS

Dollmann, "Bayesian Networks: Combining Machine Learning and Expert Knowledge into Explainable AI," Jul. 3, 2020, https://medium.com/eliiza-ai/bayesian-networks-combining-machine-learning-and-expert-knowledge-into-explainable-ai-efaf6f8e69b, 10 pages.

(Continued)

*Primary Examiner* — Paul E Callahan
(74) *Attorney, Agent, or Firm* — Amin, Turocy & Watson, LLP

(57) ABSTRACT

One or more systems, devices, computer program products and/or computer-implemented methods of use provided herein relate to generating a security threat prediction. A system can comprise a memory that stores computer executable components, and a processor that executes the computer executable components stored in the memory. The computer executable components can comprise a prediction component that analyzes a public data graph model to generate a primary security threat determination, wherein the prediction component can further generate a secondary security threat prediction based on the primary security threat determination and on a proprietary data graph model, wherein the proprietary data graph model comprises proprietary security threat data from a source, and wherein the proprietary security threat data has been scrubbed of source-identifiers. An obtaining component can obtain an agreement from the source to share the proprietary security threat data with another source that has access to the proprietary data graph model.

20 Claims, 10 Drawing Sheets

(56) References Cited

U.S. PATENT DOCUMENTS

| | | | |
|---|---|---|---|
| 2018/0219888 A1 | 8/2018 | Apostolopoulos | |
| 2018/0234310 A1* | 8/2018 | Ingalls | H04L 41/12 |
| 2020/0364541 A1* | 11/2020 | Cho | G06V 10/454 |
| 2021/0125105 A1 | 4/2021 | Xie et al. | |
| 2021/0279621 A1 | 9/2021 | Lin et al. | |
| 2023/0229570 A1* | 7/2023 | Cepek | G06N 3/045 |

OTHER PUBLICATIONS

OCA, "Open Cybersecurity Alliance," https://opencybersecurityalliance.org/, Jul. 15, 2022, 7 pages.

Bhattacharjee, Cybersecurity Threat Prediction Using Ensemble Machine Learning, May 7, 2020, https://towardsdatascience.com/Cybersecurity-Threat-Prediction-Using-Ensemble-Machine-Learning-e1d61976664, 14 pages.

Microsoft, Confidential AI, Apr. 3, 2022, https://www.microsoft.com/en-us/research/project/confidential-ai/,3 pages.

CrowdStrike, "CrowdStrike Threat Graph," Apr. 3, 2022, https://www.crowdstrike.com/falcon-platform/threat-graph/, 17 pages.

Noel, et al., "CyGraph: Graph-Based Analytics and Visualization for Cybersecurity," Handbook of Statistics. http://dx.doi.org/10.1016/bs.host.2016.07.001, © 2016 Elsevier B.V, 51 pages.

Liu, et al., "FAIXID: A Framework for Enhancing AI Explainability of Intrusion Detection Results Using Data Cleaning Techniques," Journal of Network and Systems Management, https://doi.org/10.1007/s10922-021-09606-8, Oct. 16, 2020, 30 pages.

Sun, et al., "Using Bayesian Networks for Probabilistic Identification of Zero-day Attack Paths," DOI 10.1109 TIFS.2018.2821095, IEEE Transactions on Information Forensics and Security, © 2018 IEEE, 16 pages.

Mell et al., The NIST Definition of Cloud Computing, Recommendations of the National Institute of Standards and Technology, NIST Special Publication 800-145, Sep. 2011, 7 pages.

Lin, et al., "Graph Computing Over Micro-Level and Macro-Level Views," U.S. Appl. No. 17/368,627, filed Jul. 6, 2021, 48 pages.

* cited by examiner

SECURITY THREAT DETECTION USING COLLABORATIVE INTELLIGENCE

TECHNICAL FIELD

The present disclosure relates to security threat detection, and more specifically to security threat detection employing explainable artificial intelligence reasoning and collaborative intelligence from both public and proprietary data sources.

BACKGROUND

With current advances in cyber hacking, software and/or hardware system infiltration, and/or cyber security overtasking, it can be difficult to employ preventive cybersecurity measures and/or to accurately and/or consistently detect infiltration of a software and/or hardware system.

SUMMARY

The following presents a summary to provide a basic understanding of one or more embodiments described herein. This summary is not intended to identify key or critical elements, and/or to delineate scope of particular embodiments or scope of claims. Its sole purpose is to present concepts in a simplified form as a prelude to the more detailed description that is presented later. In one or more embodiments described herein, systems, computer-implemented methods, apparatuses and/or computer program products can provide a process to detect and/or predict a security threat to a software and/or hardware system. As used herein, a security threat can comprise any unintended infiltration and/or use of a system, such as a software and/or hardware system.

In accordance with an embodiment, a system can comprise a memory that stores computer executable components, and a processor that executes the computer executable components stored in the memory, wherein the computer executable components can comprise a prediction component that analyzes a public data graph model to obtain a primary security threat determination, wherein the prediction component further generates a secondary security threat prediction based on the primary security threat determination and on a proprietary data graph model, wherein the proprietary data graph model comprises proprietary security threat data from a user entity, and wherein the proprietary security threat data has been scrubbed of source-identifiers.

As used herein, the term "proprietary" can mean not public, private, and/or not shared by the owner with the public by default. Rather, the proprietary data from the user entity can be shared based on an agreement of access by at least another user entity to the proprietary data, the proprietary data graph model, and/or the secondary security threat prediction.

As used herein, "secondary" can refer to the "security threat prediction" being secondary to the "security threat determination", being "primary."

An advantage of the above-indicated system can be employing collaborative intelligence from both public source and proprietary user entities, that otherwise would not be available to a user entity and/or prediction system, to predict a security threat to the user entity or to a system employed by the user entity.

As used herein, a "user entity" can comprise a machine, device, component, hardware, software, smart device and/or human.

As used herein, the term "predict" can comprise tracking, detection, determination, identification, prediction and/or the like.

Another advantage of the above-indicated system can be ability to share, by the source, the proprietary data having been scrubbed of source-identifiers, such as where context can be shared among collaborating user entities (e.g., sources) employing the system, without sharing of source-identifiers.

In accordance with another embodiment, a computer-implemented method can comprise analyzing, by a system utilizing a processor and memory, a public data graph model to obtain a primary security threat determination, and generating, by the system, a secondary security threat prediction based on the primary security threat determination and on a proprietary data graph model, wherein the proprietary data graph model comprises proprietary security threat data from a user entity, and wherein the proprietary security threat data has been scrubbed of source-identifiers.

An advantage of the above-indicated method can be employing collaborative intelligence from both public and proprietary source and proprietary sources (e.g., including user entities), that otherwise would not be available to a user entity, to predict a security threat to the user entity or to a system employed by the user entity. As used herein, a user entity can comprise a machine, device, component, hardware, software, smart device and/or human.

Another advantage of the above-indicated method can be ability to share, by the proprietary sources, the proprietary data having been scrubbed of source-identifiers, such as where context can be shared among collaborating user entities (e.g., sources) employing the system, without sharing of source-identifiers.

In accordance with yet another embodiment, a computer program product providing a process to generate a security threat prediction can comprise a computer readable storage medium having program instructions embodied therewith, the program instructions executable by a processor to cause the processor to analyze, by the processor, a public data graph model to obtain a primary security threat determination, and generate, by the processor, a secondary security threat prediction based on the primary security threat determination and on a proprietary data graph model, wherein the proprietary data graph model comprises proprietary security threat data from a source, and wherein the proprietary security threat data has been scrubbed of source-identifiers.

An advantage of the above-indicated computer program product can be employing collaborative intelligence from both public and proprietary sources, that otherwise would not be available to a user entity and/or prediction system, to predict a security threat to the user entity or to a system employed by the user entity. As used herein, a user entity can comprise a machine, device, component, hardware, software, smart device and/or human.

Another advantage of the above-indicated computer program product can be ability to share, by a proprietary source, the proprietary data having been scrubbed of source-identifiers, such as where context can be shared among collaborating user entities (e.g., sources) employing the system, without sharing of source-identifiers.

Another advantage of any of the aforementioned system, computer-implemented method and/or computer program product can be provision of a security threat prediction process that offers properties of privacy, trustworthiness and explainability. That is, as indicated, proprietary data can be shared after having been scrubbed of source-identifiers, thus promoting privacy. Sharing can be among a group of user entities that have each agreed to share the proprietary data with one another, and the sharing can be facilitated by secure cloud functions among the user entities, thus promoting trustworthiness. Further, the prediction processes employed can provide reasoning underlying the prediction, such that an open box system can be employed for explainability understood by both the system itself and by the user entities employing the system, computer-implemented method and/or computer program product.

DESCRIPTION OF THE DRAWINGS

FIG. 7 also illustrates an exemplary pair of flow-based diagrams depicting coverage of predictable threats, in accordance with one or more embodiments described herein.

DETAILED DESCRIPTION

Figure 1:
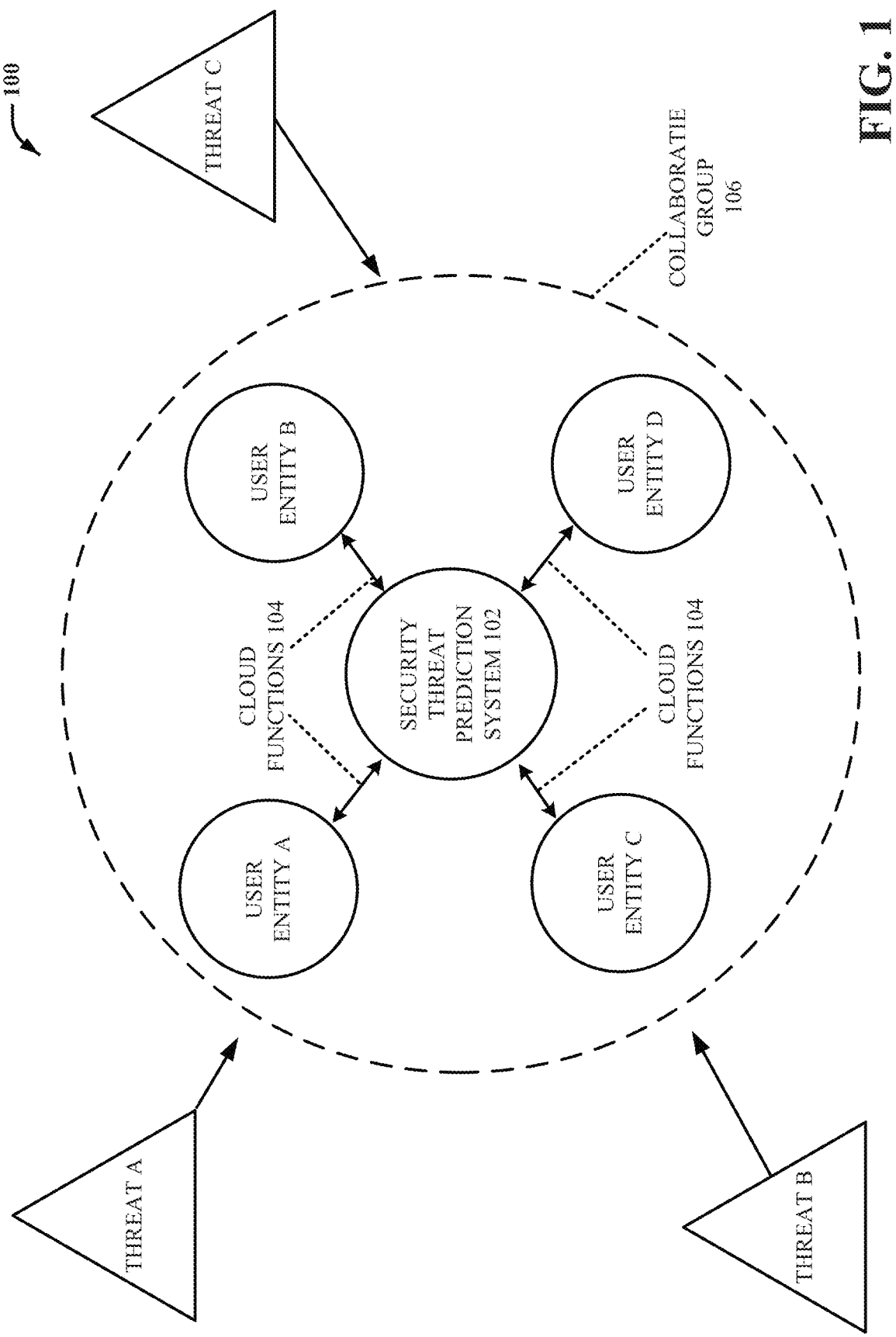
FIG. 1 illustrates a block diagram of an example, non-limiting system that can provide a process to generate a security threat prediction, in accordance with one or more embodiments described herein.

The following detailed description is merely illustrative and is not intended to limit embodiments and/or application or utilization of embodiments. Furthermore, there is no intention to be bound by any expressed or implied information presented in the preceding Summary section, or in the Detailed Description section. One or more embodiments are now described with reference to the drawings, wherein like reference numerals are utilized to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Existing cybersecurity threat prediction frameworks are often closed box, do not ensure privacy of data used in analysis, and/or sharing of data can itself be insecure. Data can be biased and/or unbalanced due to possible adulteration of the data itself, particularly where the data is publicly available. Furthermore, in instances of single intrusion, data for analysis of the intruder (e.g., bad actor) can be scarce, with few clues being left to work from.

This can, in some cases, be due to the cyberattack being a targeted attack, such as from an advanced persistent threat (APT). An APT can be a stealthy threat actor, such as a nation state, sponsored group, state-sponsored group and/or the like that can gain unauthorized access to a computer network and/or system and which can remain undetected for an extended period of time. The extended period of time can be weeks, months, or even years. With this type of threat, data analysis for predicting the intrusion, such as including detecting and/or tracking the intrusion, can be fraught with difficulty due to lack of data to analyze, false positive predictions and/or false negative predictions.

Indeed, conventional frameworks do not account for such stealthy and/or targeted attackers, and thus do not provide tailoring and/or a framework that can address such intrusion(s). Differently, a system, computer-implemented method and/or computer program product of one or more embodiments described herein can learn, be trained, and/or employ both publicly-available and proprietary data, such as from a plurality of sharing parties (also herein referred to as sources). Furthermore, the one or more embodiments can promote processes of data privacy amongst the sharing parties, analysis trustworthiness (e.g., among trusted sharing parties), and analysis explainability.

For example, consider a scenario where minimal data is available for collection from a cybersecurity crime scene. Statistical approaches can be limited due to the limited availability of data, and thus a balanced data set cannot be statistically generated. Both publicly-available data and proprietary data from the intruded-party (the party that was intruded upon by a bad actor) are available. In is noted that in one or more cases, game-theoretic issue can provide false positive and/or false negative results, in combination with a lack of available proprietary data.

Differently, the one or more frameworks discussed herein can account for one or more of these deficiencies and can provide a security threat prediction that is driven by properties of data privacy, process trustworthiness and process explainability. For example, a security threat prediction process can use proprietary data that has been scrubbed of source-identifying data (e.g., source-identifiers such as metadata, labels, tags and/or the like), thus promoting privacy during data sharing. This proprietary data can come from plural parties (e.g., user entities). The sharing can take place among user entities being approved by one another. Further, the sharing can be facilitated by one or more trusted and secure cloud functions to which only approved user entities (e.g., sources having agreements in place with one another for the sharing of the proprietary data and results depending therefrom) have access, promoting trustworthiness of the prediction process. Additionally, the prediction process can be open box, such that explainability data, providing reasoning for a prediction made, can be presented and/or accessible to the user entities, thus promoting explainability.

In combination with these properties, the one or more processes employed can be collaborative. For example, the data employed to generate a security threat prediction can be shared and sanitized (e.g., scrubbed of source-identifiers), analytical models employed in generating the prediction, such as an artificial intelligence (AI) model itself, which is based on sanitized data, can be shared, and/or a shared AI can be employed as a service, such as employing one or more cloud functions. Such shared AI can be at least partially based on the shared and sanitized data and thus can be trained on both publicly-available data and on the shared and sanitized proprietary data. Further, the proprietary data can be collaborative data from multiple parties sharing data amongst one another. In one or more cases, the sharing itself can be anonymous, although still can be facilitated between a selected group of trusted user entities by one or more systems, methods and/or computer program products described herein.

The aforementioned properties and collaborations together can provide a successful process(es) for security threat generation, which can be employed to prevent and/or mitigate current and/or future intrusion issues and/or concerns. Indeed, use of public data alone cannot provide such secure process(es).

Further, a closed box process (e.g., that does not provide explainability to a user entity) cannot provide explainability data such as to layout reasoning for why a prediction is made. Rather, an open box process can be desired, such as in a scenario where existing security threat prediction frameworks can majoratively indicate no security threat, but a collaborative approach, as discussed herein, can identify a security threat. That is, in such scenario, explainability from open box prediction processes can lead to greater trusting of the processes by user entities, and thus can further lead to greater use of the prediction process, including greater data sharing. In this way, the one or more frameworks discussed herein can be self-promoting and can lead to better predictions through increased sharing of proprietary data (e.g., scrubbed proprietary data where context but not source-identifiers can be shared).

As mentioned above, in one or more embodiments, an analytical model, such as the one previously mentioned, can be employed to automatically generate proprietary data models, public data models, and/or combined collaborative data models for use by the one or more security threat prediction processes of the one or more frameworks discussed herein. These models can, in one or more cases, be shared, such as using trusted and secure cloud functions to which only a selected group of user entities can have access.

The analytical models themselves can employ reasoning processes that can allow for open box approaches (e.g., providing explainability to user entities). For example, Bayesian reasoning can be employed where Bayesian reasoning models can be constructed locally (e.g., relative to a single user entity) using proprietary (e.g., scrubbed) data, where the model can then be exposed to others of the trusted user entities. Bayesian reasoning can be employed because of the ability to graphically present the data employed by models using Bayesian reasoning, such that a user entity can view a graphical representation of one or more processes leading to a security threat prediction, or leading to no prediction of any security threat. Accordingly, the one or more frameworks provided herein can facilitate visual display of reasoning data to a user entity, which reasoning data can be depicted in one or more matrices, flow charts and/or the like.

Turning now to further details, one or more embodiments are now described with reference to the drawings, where like referenced numerals are used to refer to like elements throughout. In the following description, for purposes of explanation, numerous specific details are set forth in order to provide a more thorough understanding of the one or more embodiments. It is evident in various cases, however, that the one or more embodiments can be practiced without these specific details.

Further, it should be appreciated that the embodiments depicted in one or more figures described herein are for illustration only, and as such, the architecture of embodiments is not limited to the systems, devices and/or components depicted therein, nor to any particular order, connection and/or coupling of systems, devices and/or components depicted therein. For example, in one or more embodiments, the non-limiting systems 100, 200 and/or 300 illustrated at FIGS. 1, 2 and/or 3 and/or systems thereof, can further comprise one or more computer and/or computing-based elements described herein with reference to a computing environment, such as the computing environment 1000 illustrated at FIG. 10. In one or more described embodiments, computer and/or computing-based elements can be used in connection with implementing one or more of the systems, devices, components and/or computer-implemented operations shown and/or described in connection with FIGS. 1, 2 and/or 3 and/or with other figures described herein.

Turning now in particular to one or more figures, and first to FIG. 1, the figure illustrates a block diagram of an example, non-limiting system 100 that can facilitate security threat prediction, in accordance with one or more embodiments described herein.

The non-limiting system 100 can comprise a security threat prediction system 102 that can be employed by a plurality of user entities A, B, C and D. These user entities can access the security threat prediction system 102, and thus can provide scrubbed proprietary data using trusted and secure cloud functions 104. For example, in one or more cases, only the user entities A, B, C and D can have access to the trusted and secure cloud functions 104. In one or more cases, the user entities can have agreed to share data and to have shared access to the security threat prediction system 102, such as to at least a portion of such system, such as analytical models and/or the proprietary data. That is, the user entities (e.g., sources) A, B, C and D can be comprised by a collaborative group 106 that together can share data to predict attacks, intrusions and/or other security threats (e.g., threats A, B and C) from bad actors, such as APTs.

Figure 2:
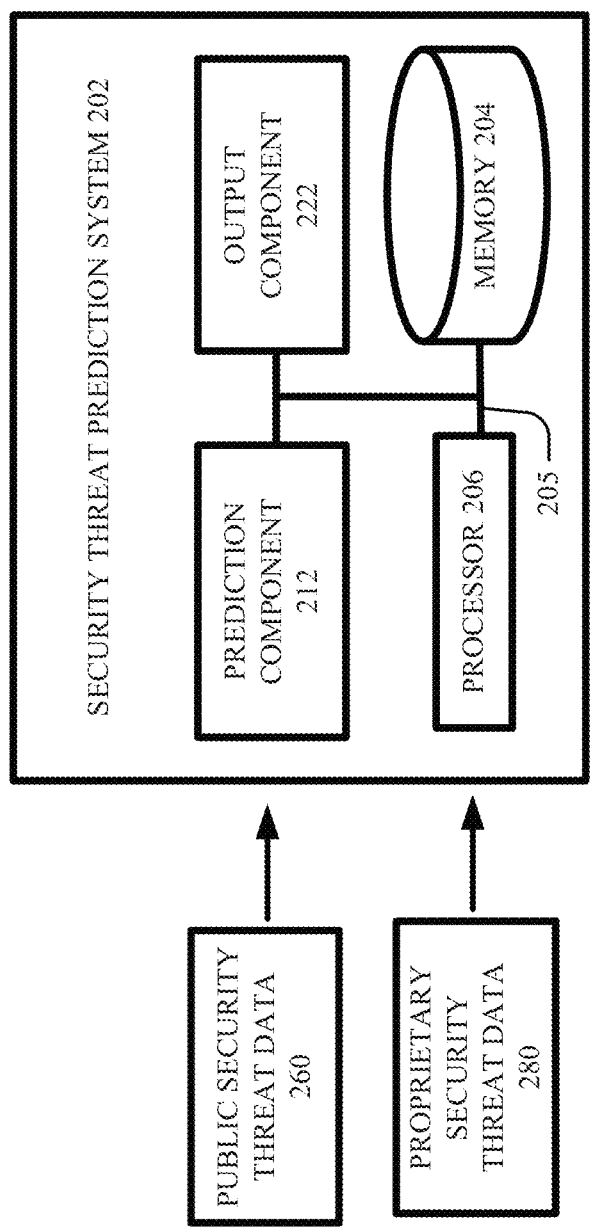
FIG. 2 illustrates a block diagram of another example, non-limiting system that can provide a process to generate a security threat prediction, in accordance with one or more embodiments described herein.

Turning next to FIG. 2, the figure illustrates yet another block diagram of an example, non-limiting system 200 that can facilitate security threat prediction, in accordance with one or more embodiments described herein.

The non-limiting system 200 can comprise a security threat prediction system 202, which can be associated with a cloud computing environment. The security threat prediction system 202 can comprise one or more components, such as a memory 204, processor 206, bus 205, prediction component 212 and/or output component 222. Generally, security threat prediction system 202, and thus non-limiting system 200, can facilitate use of public security threat data 260 and proprietary security threat data 280 to output a security threat prediction.

For example, the prediction component 212 can analyze a public data graph model, such as based on public security threat data 260, to generate a primary security threat determination. That is, the primary security threat determination can be based only on publicly-available data, and thus can less accurate due to less-specific data being employed. The prediction component 212 further can generate a secondary security threat prediction based on the primary security threat determination and on a proprietary data graph model, such as based on the proprietary security threat data 280. That is, the secondary security threat prediction can be based on both publicly-available data and proprietary data.

The output component 222 can output both of the primary security threat determination and the secondary security threat prediction to one or more user entities (which can include one or more sources of the proprietary security threat data 280) of the security threat prediction system 202.

Figure 3:
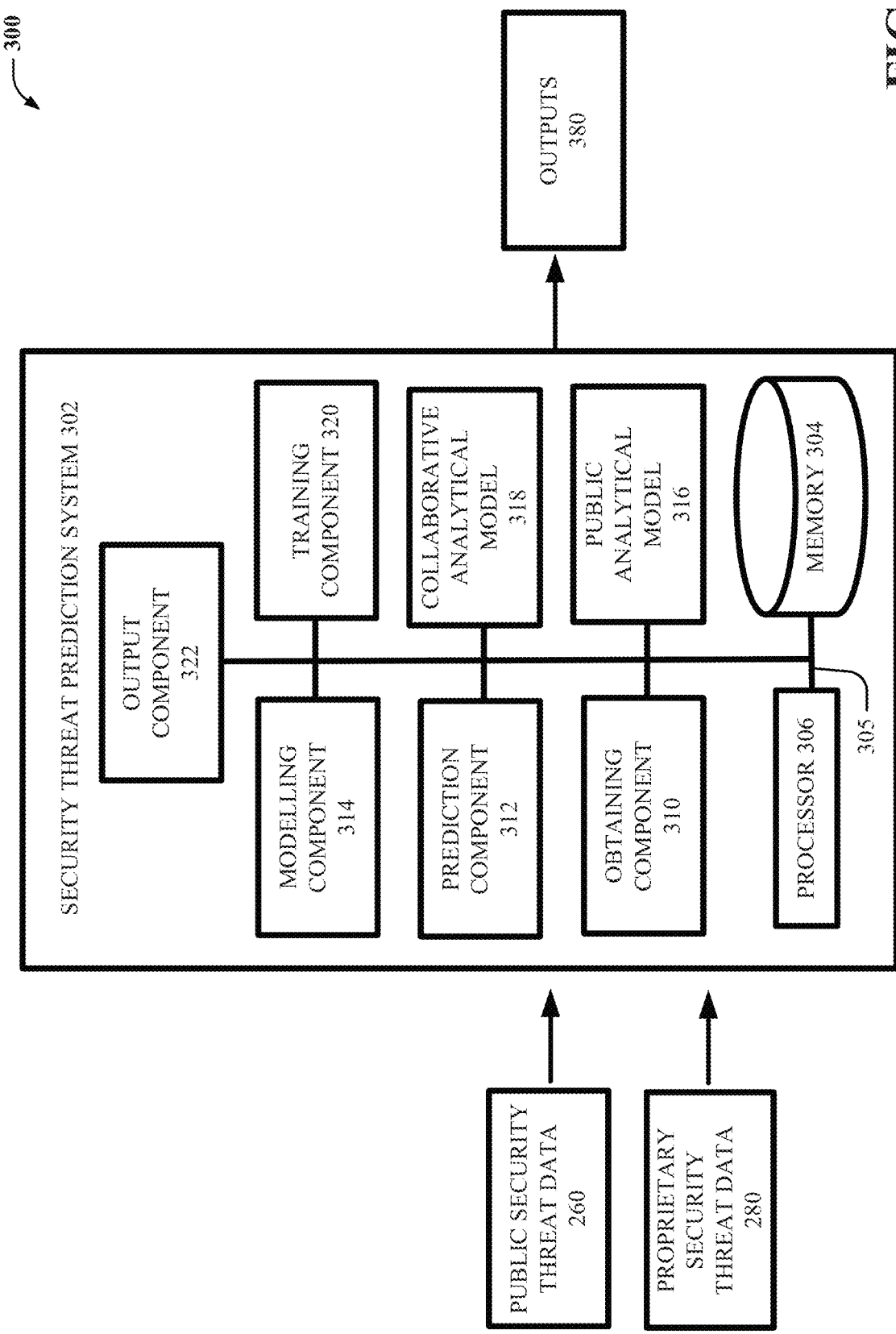
FIG. 3 illustrates a block diagram of yet another example, non-limiting system that can provide a process to generate a security threat prediction, in accordance with one or more embodiments described herein.

Turning next to FIG. 3, a non-limiting system 300 is illustrated that can comprise a security threat prediction system 302. Repetitive description of like elements and/or processes employed in respective embodiments is omitted for sake of brevity. Description relative to an embodiment of FIG. 2 can be applicable to an embodiment of FIG. 3. Likewise, description relative to an embodiment of FIG. 3 can be applicable to an embodiment of FIG. 2.

One or more communications between one or more components of the non-limiting system 300 can be provided by wired and/or wireless means including, but not limited to, employing a cellular network, a wide area network (WAN) (e.g., the Internet), and/or a local area network (LAN). Suitable wired or wireless technologies for supporting the communications can include, without being limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra-mobile broadband (UMB), high speed packet access (HSPA), Zigbee and other 802.XX wireless technologies and/or legacy telecommunication technologies, BLUETOOTH®, Session Initiation Protocol (SIP), ZIGBEE®, RF4CE protocol, WirelessHART protocol, 6LoWPAN (Ipv6 over Low power Wireless Area Networks), Z-Wave, an advanced and/or adaptive network technology (ANT), an ultra-wideband (UWB) standard protocol and/or other proprietary and/or non-proprietary communication protocols.

The security threat prediction system 302 can be associated with, such as accessible via, a cloud computing environment.

Generally, the security threat prediction system 302 can comprise any suitable type of component, machine, device, facility, apparatus and/or instrument that comprises a processor and/or can be capable of effective and/or operative communication with a wired and/or wireless network. All such embodiments are envisioned. For example, the security threat prediction system 302 can comprise a server device, computing device, general-purpose computer, special-purpose computer, quantum computing device (e.g., a quantum computer), tablet computing device, handheld device, server class computing machine and/or database, laptop computer, notebook computer, desktop computer, cell phone, smart phone, consumer appliance and/or instrumentation, industrial and/or commercial device, digital assistant, multimedia Internet enabled phone, multimedia players and/or another type of device and/or computing device. Likewise, the security threat prediction system 302 can be disposed and/or run at any suitable device, such as, but not limited to a server device, computing device, general-purpose computer, special-purpose computer, quantum computing device (e.g., a quantum computer), tablet computing device, handheld device, server class computing machine and/or database, laptop computer, notebook computer, desktop computer, cell phone, smart phone, consumer appliance and/or instrumentation, industrial and/or commercial device, digital assistant, multimedia Internet enabled phone, multimedia players and/or another type of device and/or computing device.

The security threat prediction system 302 can comprise a plurality of components. The components can comprise a memory 304, processor 306, bus 305, obtaining component 310, prediction component 312, modelling component 314, public analytical model 316, collaborative analytical model 318, training component 320 and/or output component 322.

Generally, the security threat prediction system 302 can generate a security threat prediction that is based on both the public security threat data 260 and on the proprietary security threat data 280, while providing explainability data to a user entity to explain the security threat prediction. Further, the proprietary security threat data 280 can come from plural sources, thus expanding the available intelligence data pool for use in generating one or more security threat predictions by the security threat prediction system 302.

Discussion first turns briefly to the processor 306, memory 304 and bus 305 of the security threat prediction system 302. For example, in one or more embodiments, the security threat prediction system 302 can comprise the processor 306 (e.g., computer processing unit, microprocessor, classical processor, quantum processor and/or like processor). In one or more embodiments, a component associated with security threat prediction system 302, as described herein with or without reference to the one or more figures of the one or more embodiments, can comprise one or more computer and/or machine readable, writable and/or executable components and/or instructions that can be executed by processor 306 to provide performance of one or more processes defined by such component(s) and/or instruction(s). In one or more embodiments, the processor 306 can comprise the obtaining component 310, prediction component 312, modelling component 314, public analytical model 316, collaborative analytical model 318, training component 320 and/or output component 322.

In one or more embodiments, the security threat prediction system 302 can comprise the computer-readable memory 304 that can be operably connected to the processor 306. The memory 304 can store computer-executable instructions that, upon execution by the processor 306, can cause the processor 306 and/or one or more other components of the security threat prediction system 302 (e.g., obtaining component 310, prediction component 312, modelling component 314, public analytical model 316, collaborative analytical model 318, training component 320 and/or output component 322) to perform one or more actions. In one or more embodiments, the memory 304 can store computer-executable components (e.g., obtaining component 310, prediction component 312, modelling component 314, public analytical model 316, collaborative analytical model 318, training component 320 and/or output component 322).

The security threat prediction system 302 and/or a component thereof as described herein, can be communicatively, electrically, operatively, optically and/or otherwise coupled to one another via a bus 305. Bus 305 can comprise one or more of a memory bus, memory controller, peripheral bus, external bus, local bus, quantum bus and/or another type of bus that can employ one or more bus architectures. One or more of these examples of bus 305 can be employed.

In one or more embodiments, the security threat prediction system 302 can be coupled (e.g., communicatively, electrically, operatively, optically and/or like function) to one or more external systems (e.g., a non-illustrated electrical output production system, one or more output targets, an output target controller and/or the like), sources and/or devices (e.g., classical and/or quantum computing devices, communication devices and/or like devices), such as via a network. In one or more embodiments, one or more of the components of the security threat prediction system 302 and/or of the non-limiting system 300 can reside in the cloud, and/or can reside locally in a local computing environment (e.g., at a specified location(s)).

In addition to the processor 306 and/or memory 304 described above, the security threat prediction system 302 can comprise one or more computer and/or machine readable, writable and/or executable components and/or instructions that, when executed by processor 206, can provide performance of one or more operations defined by such component(s) and/or instruction(s).

Turning now to the additional components of the security threat prediction system 302 (e.g., obtaining component 310, prediction component 312, modelling component 314, public analytical model 316, collaborative analytical model 318, training component 320 and/or output component 322), generally, the security threat prediction system 302 can obtain and analyze public security threat data 260 and proprietary security threat data 280 to generate one or more security threat predictions as outputs 380.

Turning first to the obtaining component 210, this component can obtain (e.g., receive, transfer, search for, identify and/or the like) an agreement from one or more sources to share their respective proprietary data. This agreement can comprise agreement by the source to share the proprietary data with another source that has access to the proprietary data itself and/or to a private data graph model.

The one or more sources likewise can be user entities of the system, and thus have access to the proprietary data and/or additional results of analysis of the proprietary data by the security threat prediction system 302. That is, the obtaining component 210 can obtain an agreement by a source to agree to be a trustworthy and non-sharing (e.g., outside of the respective collaborative group and the security threat prediction system 302) user entity of the security threat prediction system, the proprietary data 208, the resulting proprietary data graph model, the resulting prediction(s), and/or the resulting training artificial intelligence models. This agreement can comprise agreement not to share any system data outside of the collaborative group and/or not to share any new proprietary data with other than the collaborative group of user entities and the security threat prediction system 302.

In one or more embodiments, a user entity of the system can be a user entity that does not share proprietary data (e.g., non-sharing entity).

As will be discussed below, in one or more scenarios, less than all of the proprietary data 208, the resulting proprietary data graph model, the resulting prediction(s), and/or the resulting training artificial intelligence models can be shared, by the security threat prediction system 302 with the user entities. For example, in varying scenarios, only resulting artificial intelligence models, trained on the proprietary data can be shared, only access to the artificial intelligence models can be shared (and not the actual artificial intelligence models themselves), only the private data graph models can be shared, and/or any combination thereof.

The obtaining component 210 further can identify, search, receive, transfer and/or otherwise obtain the public security threat data 260 and proprietary security threat data 280. For example, public security threat data 260 can be obtained from one or more public sources, such as websites, programs, software, applications and/or the like. As mentioned, the proprietary security threat data 280 can be obtained from sharing user entities, having been approved to share data amongst one another.

In one or more embodiments, the proprietary data (e.g., proprietary security threat data 280) shared by the agreeing user entities can have been scrubbed of source-identifiers (e.g., identifying the sharing user entity) prior to sharing.

As indicated above, by the scrubbing, remaining context can be shared among collaborating user entities (e.g., sources) employing the system, without sharing of source-identifiers. For example, the proprietary security threat data 280 can comprise context data such as detected intruders, malware info, detected addresses and/or the like, but having been scrubbed of user entity IP addresses, private hash information and/or the like. Additional and/or alternative context data types can comprise "artifact", "autonomous-system", "directory", "email-addr", "email-message", "mac-addr", "mutex", "process", "software", "user-account", "windows-registry-key", "x509-certificate", "ipv4-addr", "ipv6-addr", "domain-name", "url", "network-traffic", and/or "file".

The resulting extended inferables can provide the context in the form of inferable paths that can contribute to the later and combined predictions, such as absent inferable paths and/or metadata to the source identity, IP addresses, proprietary information and/or the like of the source and/or sharing user entity. For example, where x (identity), where x is scrubbed and results in y (prediction), y alone can be useless. However, instead, where x (identity) results in y (extended context) and then results in z (prediction), where x is scrubbed, the "y to z" transition can comprise the extended inferable. This extended inferable can be used by the modelling component 314 to generate a graph model (e.g., proprietary data graph model 414 of FIG. 4) that models the proprietary security threat data 280. Because the y (extended context) comprises information to allow for the inference without the source-identifier, the y (extended context) can be considered a predicate to the z (prediction) and indeed can be tagged with a probability distribution, to be further described below.

The proprietary security threat data 280 can be accessed, transferred and/or otherwise shared using trusted and secure cloud functions or other suitable methods. The security threat data can comprise metadata.

In one or more embodiments, where the proprietary security threat data 280 transferred from the respective source or sharing user entity has not been scrubbed of source-identifiers, and/or all source-identifiers, prior to the sharing/transfer, the security threat prediction system 302, such as the modelling component 314 can perform this scrubbing based on removing any context that directly mentions the user entity by whom the proprietary security threat data 280 was shared. For example, Turning next to the modelling component 314, this component can, using the public security threat data 260 and the proprietary security threat data 280, generate data models for use in making one or more security threat predictions by the prediction component 312. That is, referring now to FIG. 4 in addition to still referring to FIG. 3, the modelling component 314 can generate a public data graph model 412 based on the public security threat data 260. For example, context nodes and threat-intelligence nodes can be populated with the public security threat data 260, and these nodes can be connected with links where relational links are identified. The modelling component 314 further can generate a proprietary data graph model 414 based on the proprietary security threat data 280. For example, context nodes and threat-intelligence nodes can be populated with the proprietary security threat data 280, and these nodes can be connected with links where relational links are identified. The modelling component 314 further can generate a combined data graph model 424, to be explained below. For example, context nodes and threat-intelligence nodes can be populated with the proprietary security threat data 280 and data from the primary security threat determination 420, and these nodes can be connected with links where relational links are identified.

Generally, the prediction component 312 can generate both a primary security threat determination 420 and a secondary security threat prediction 430, to be explained below.

More particularly, by analyzing the public data graph model 412, the prediction component 312 can determine (e.g., at decision step 416) if, for a specified user entity, a compromise is predicted, and can subsequently generate a primary security threat determination 420.

In one or more embodiments, Bayesian reasoning can be employed to output the primary security threat determination 420 in an explainable form.

For example, a primary security threat determination 420 can be made, by the prediction component 312, using Bayesian inference using the matched nodes (e.g., context nodes and threat-intelligence nodes) and the relational links. For instance, in an example incident, one IP address can be matched to one of ten associated IP addresses shared by trusted parties (e.g., user entities other than the specified user entity). According to the proprietary shared data, the related IP address can be found to be related to a threat actor. In response, the incident at issue can be determined to be related to that threat actor because of the relational linkage.

Additionally, Bayesian inference is probability based. Thus, a link between any IP address node and a related threat node can comprise a probability of relation, such as "this IP implies this threat". For example, a Bayesian inference drawn from the public data graph model 412 can be 0.7 probability (in a range of 0 to 1.0) that the current incident is related to a particular threat actor "A". In one or more embodiments, a user entity can specify addition of a threshold to enforce that only certain probabilities will be reported as a primary security threat determination, such as prob. >0.8 being reported.

Bayesian reasoning can leverage this initial probability to calculate an aggregated probability of the incident being related to certain threat (e.g., from various sources of public security threat data 260). From this aggregated probability, the primary security threat determination 420 can be weighted, such as for tempering the use of the primary security threat determination 420 as compared to the proprietary security threat data 280 for generating the combined data graph model 424.

In still other scenarios, one or more, such as all, probabilities of public security threat data 260 can be 1.0.

Figure 4:
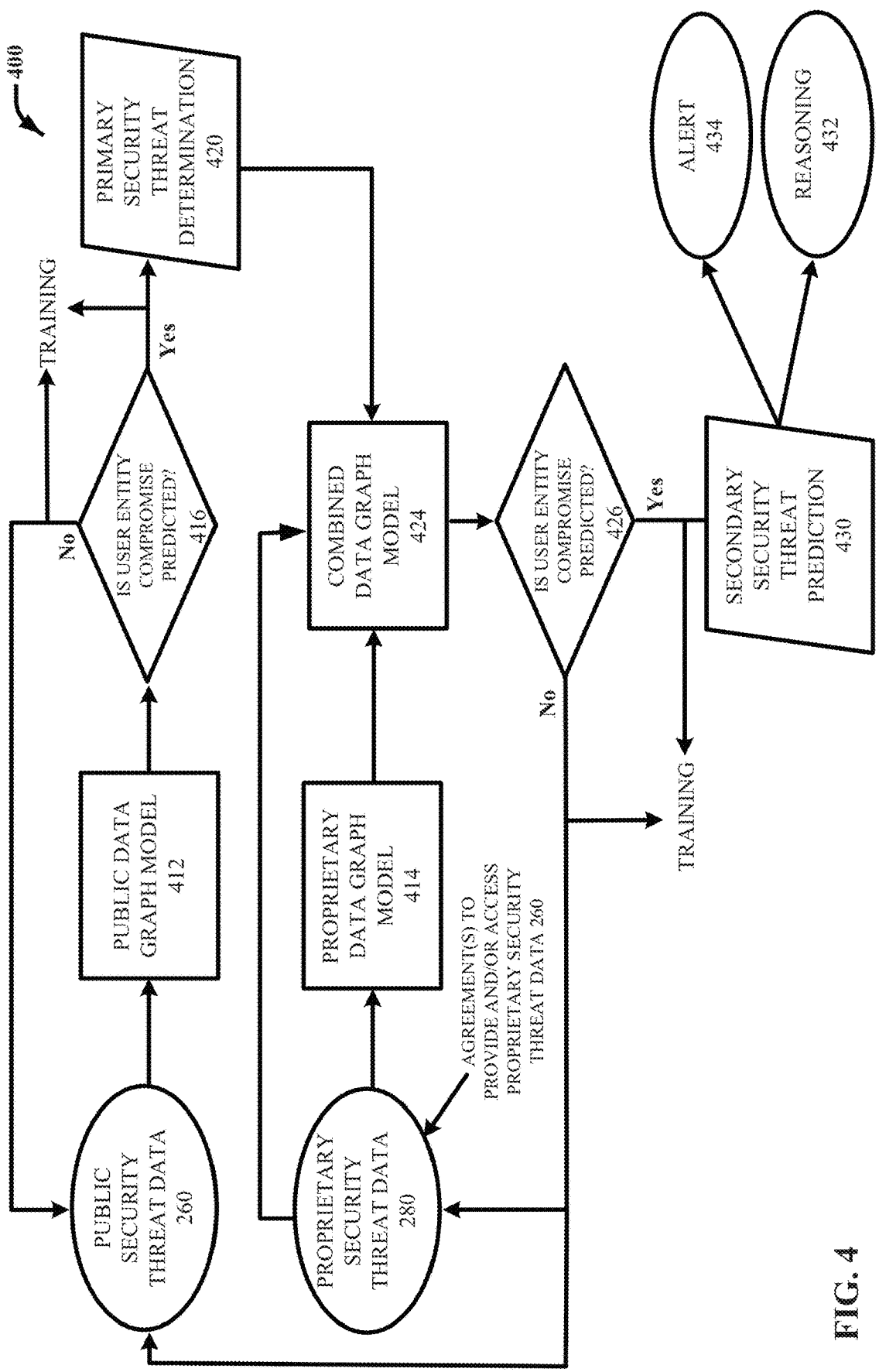
FIG. 4 illustrates a block flow diagram illustrating use of a security threat prediction system of FIG. 3, in accordance with one or more embodiments described herein.

In connection with these understandings, as illustrated at FIG. 4, whether or not the primary security threat determination 420 is accurate and/or satisfies a threshold for accuracy, the primary security threat determination 420, and the data underlying the primary security threat determination 420, can be used to generate a secondary security threat prediction 430. Further, the resultant data can be employed for training one or more analytical models, as will be explained below.

In one or more embodiments, one or more primary security threat determinations 420 can be made by public sources themselves, in addition to, and/or separate from, the public security threat data 260.

Generally, the output component 322 can output one or more outputs 380, such as the primary security threat determination 420 and the secondary security threat prediction 430.

As indicated above, the output component 322 can output the primary security threat determination 420 as one of a plurality of outputs 380.

Figure 7:
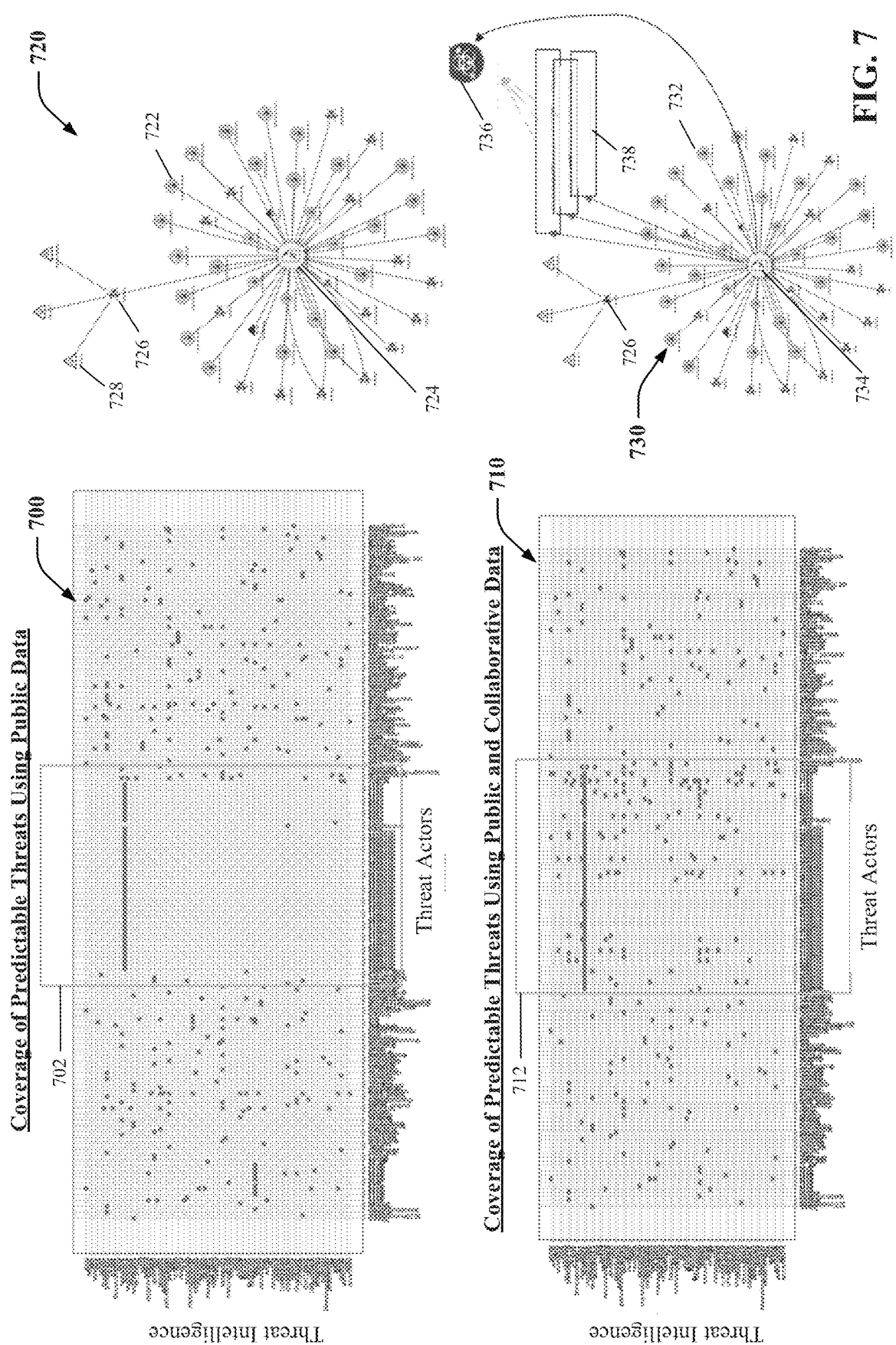
FIG. 7 illustrates an exemplary pair of graphs depicting coverage of predictable threats using public data and using both public and collaborative (e.g., proprietary) data, in accordance with one or more embodiments described herein.

In one or more embodiments, the output component 322 can output an illustration at a display, such as to a graphical user interface coupled to the security threat prediction system 302, such that a user entity can view a depiction of how the primary security threat determination 420 was made. An exemplary flow diagram 720 depicting the explainability data for the primary security threat determination 420 is illustrated at FIG. 7. As illustrated, a plurality of infected files and/or programs 722 can be identified as a web extending from a search 724. A predicted bad actor 726 can be shown having committed one or more offenses 728.

Turning now to additional processes, beyond use only of the public security threat data 260, results using the proprietary security threat data 280 will now be described.

As indicated above, the modelling component 314 can generate the combined data graph model 424. This model can be generated from the proprietary data graph model 414 and the primary security threat determination 420. As noted above, for example, context nodes and threat-intelligence nodes can be populated with the proprietary security threat data 280 and data from the primary security threat determination 420, and these nodes can be connected with links where relational links are identified.

Based on the combined data graph model 424, and thus based on both the public security threat data 260 and on the proprietary security threat data 280, the prediction component 312 can generate the secondary security threat prediction, again using Bayesian reasoning. Indeed, by analyzing the combined data graph model 424, the prediction component 312 can determine (e.g., at decision step 426) if, for a specified user entity, a compromise is predicted, and can subsequently generate the secondary security threat prediction 430.

It is noted that the secondary security threat prediction 430 can be more trustworthy than the primary security threat determination 420 due to the inclusion of the proprietary security threat data 280. That is, unlike the public security threat data 260, the proprietary security threat data 280 can be obtained from trusted parties being the only parties having access to the proprietary security threat data 280.

For example, a secondary security threat prediction 430 can be made, by the prediction component 312, using Bayesian inference using the matched nodes (e.g., context nodes and threat-intelligence nodes) and the relational links. For instance, in an example incident, one IP address can be matched to one of ten associated IP addresses shared by trusted parties (e.g., user entities other than the specified user entity). According to the proprietary shared data, the related IP address can be found to be related to a threat actor. In response, the incident at issue can be determined to be related to that threat actor because of the relational linkage.

Additionally, Bayesian inference is probability based. Thus, a link between any IP address node and a related threat node can comprise a probability of relation, such as "this IP implies this threat". For example, a Bayesian inference drawn from the proprietary data graph model 414 and/or from the proprietary security threat data 280 can be 0.7 probability (in a range of 0 to 1.0) that the current incident is related to a particular threat actor "A". In one or more embodiments, a user entity can specify addition of a threshold to enforce that only certain probabilities will be reported as a secondary security threat prediction 430, such as prob. >0.8 being reported.

Bayesian reasoning can leverage this initial probability to calculate an aggregated probability of the incident being related to certain threat. From this aggregated probability (e.g., using proprietary data from various sources), the secondary security threat prediction 430 can be weighted, such as for tempering the use of the secondary security threat prediction 430, such as compared to the primary security threat determination 420, for generating the combined data graph model 424.

The output component 322 can output the secondary security threat prediction 430 as on of the plurality of outputs 380. In one or more embodiments, the output component 322 can output an illustration at a display, such as to the graphical user interface coupled to the security threat prediction system 302, such that a user entity can view a depiction of how the secondary security threat prediction 430 was made. An exemplary flow diagram 730 depicting the explainability data for the secondary security threat prediction 430 is illustrated at FIG. 7. As illustrated, a plurality of infected files and/or programs 732 can be identified as a web extending from a search 734. A predicted bad actor 736 can be shown having committed one or more offenses 738. It is noted that while the initial bad actor 726 is still depicted in the flow-based diagram 730, the additional predicted bad actor 736 can be based on the combination of the public security threat data 260 and the proprietary security threat data 280. Thus, the predicted bad actor 736 can be predicted with higher accuracy.

Discussion now turns to optional, but beneficial, use of one or more analytical models by the security threat prediction system 302.

In one or more embodiments, the prediction component 312 and/or the modelling component 314 can at least partially employ an analytical model, such as the public analytical model 316 and/or collaborative analytical model 318. These analytical models can comprise and/or can be comprised by a classical model, predictive model, neural network, and/or artificial intelligent model. An artificial intelligent model and/or neural network (e.g., a convolutional network and/or deep neural network) can comprise and/or employ artificial intelligence (AI), machine learning (ML), and/or deep learning (DL), where the learning can be supervised, self-supervised, semi-supervised and/or unsupervised.

For example, the public analytical model 316 can be an AI model that is trained on the public security threat data 260. A series of substeps that can be employed by the public analytical model 316 to build a public data graph model 412 can comprise:
1. loop through context data (IPs, urls, files, etc.) and query related public threat intelligence for further info,
2. build direct graphs: context node—related-to→threat,
3. build indirect graphs: context node—related-to→another context node, and
4. loop through all newly added context nodes and query related threat intelligence until no more, following step 2, 3 to build graphs.

In one or more embodiments, a separate proprietary analytical model can be an AI model that is trained solely on the proprietary security threat data 280. A series of substeps that can be employed by a proprietary analytical model to build a proprietary data graph model 414 can comprise same steps as substeps 1-4 above, but leveraging threat intelligence from one or more user entities of a collaborative group (e.g., collaborative group 106).

It is noted that threat intelligence from user entities (e.g., sources) can have probabilities assigned, while public intelligence can instead be deterministic.

The collaborative analytical model 318 can be an AI model that is trained on the public security threat data 260 and on the proprietary security threat data 280. A series of substeps that can be employed by the collaborative analytical model 318 to build a combined data graph model 424 can comprise:
1. construct public graphs,
2. construct proprietary graphs,
3. build direct graphs: context node—related-to→threat,
4. build indirect graphs: context node—related-to→another context node, and
5. loop through all newly added context nodes and query related threat intelligence conducting Bayesian network inference until no more, following step 3, 4 to build graphs.

In one or more embodiments, the AI models 316 and 318 can learn, and/or access data from a database, such as a knowledge database that is communicatively coupled to the security threat prediction system.

Generally, the public analytical model 316 and the collaborative analytical model 318 each can be trained, such as by the training component 320, on a set of training data that can represent the type of data for which the system will be used. Training data can come from historical instances of intrusion, theoretical instances of intrusion and/or from one or more knowledge databases communicatively coupled to the security threat prediction system 302.

Checks of the public analytical model 316 and/or the collaborative analytical model 318, such as relative to new and/or previously unknown intelligence data (e.g., public security threat data 260, proprietary security threat data 280, bad actors, infected programs, software and/or hardware, and/or the like), can be performed periodically and/or at any other frequency. Re-training of the public analytical model 316 and the collaborative analytical model 318 can be performed employing up-to-date data collected from one or more knowledge databases, such as over a specified time window, and/or based on real-time obtained data. For example, the training component 320 can train the public analytical model 316 and the collaborative analytical model 318 upon determination of the new intelligence data, whether being public or proprietary data.

In one or more embodiments, one or more closed cases of intrusion, and/or fabricated cases of intrusion, can be employed as a check of the public analytical model 316 and the collaborative analytical model 318. In this way, a check can be provided of whether the generated models (e.g., public data graph model 412, proprietary data graph model 414, and/or combined data graph model 424) and/or security threat predictions are accurate and/or consistent with the known bad actors and/or methods employed by the known bad actors. Feedback from such checks and analyses can be automatically and/or manually transmitted to the training component 320, for example, for use in a future and/or immediate training of the public analytical model 316 and the collaborative analytical model 318.

Further, in response to generation of the secondary security threat prediction 430, additional outputs 380, in addition to the flow-graph-based explainability diagrams (e.g., 720 and 730) can be output to a user entity, such as using a trusted and secure cloud function. Other types of reasoning 432 (e.g., explainability data) can be provided, such as including matrices, logs and/or the like.

An alert 434 can be sent to the user entity for which the security threat was predicted and/or to all or some of the group of user entities of the collaborative group 106, for example. The alert 434 can be sent such as using a trusted and secure cloud function. The alert 434 can comprise a directive and/or suggestion to allocate resources and/or take a preventive and/or mitigative measure to reduce availability of access to identified bad actor, and/or to otherwise mitigate and/or prevent negative and/or undesired outcomes of such security threat.

Figure 5:
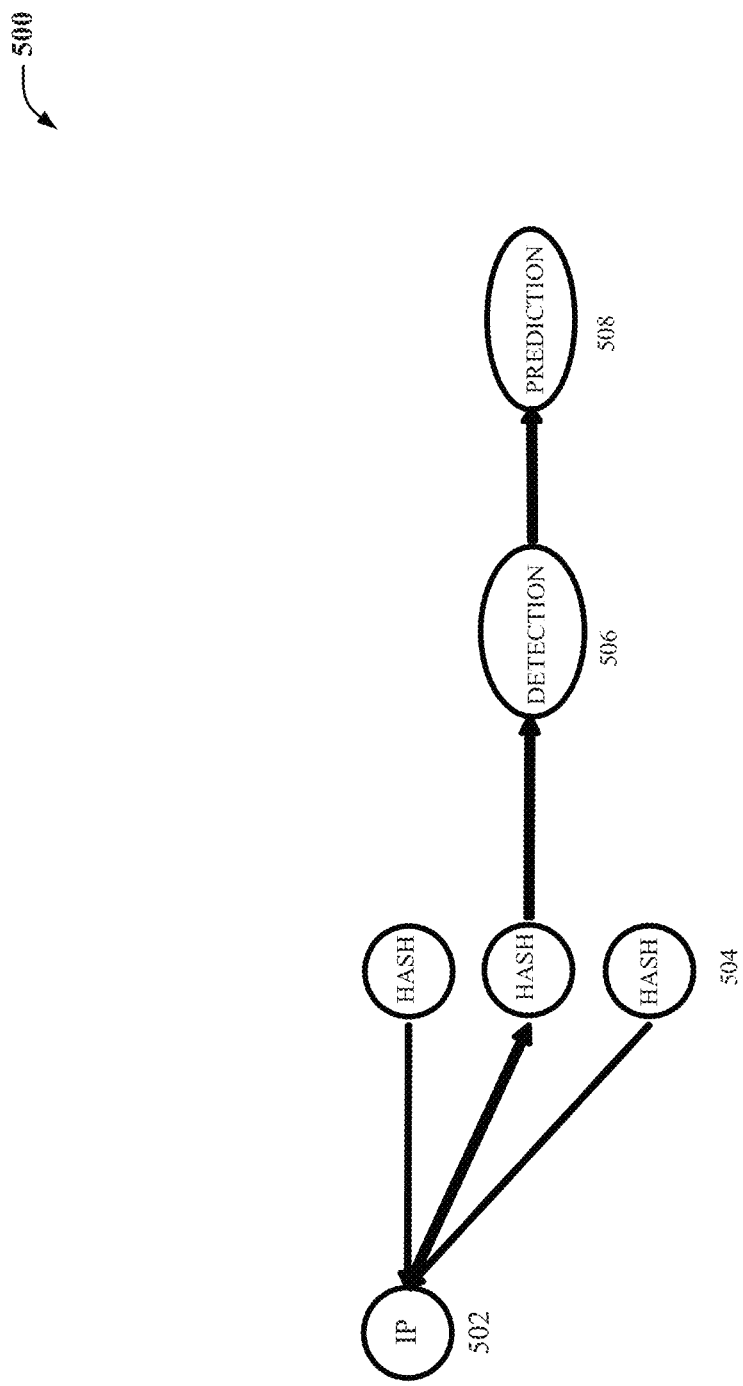
FIG. 5 illustrates a high level block diagram of inputs and outputs to a security threat prediction system of FIG. 3, in accordance with one or more embodiments described herein.

Turning now to FIG. 5, illustrated is a high level block diagram 500 of inputs and outputs to a security threat prediction system, such as the security threat prediction system 302 of FIG. 3. The diagram 500 is provided to further demonstrate the properties of privacy, trustworthiness and explainability that are provided by the one or more frameworks discussed herein.

That is, as illustrated, the security threat predictions can use proprietary data such as internet protocol (IP) addresses 502 and hashes 504 identified from searching the IP addresses 502, among other available data. This data 502 and 504 can be scrubbed of source-identifiers, thus promoting privacy during data sharing. Instead, context data, including the actual detection 506, types of actions taken by the respective bad actor and/or the like can be shared. This shared data can be referred to as extended inferables because they extend from the initial proprietary data, and allow for usable inferences based on the context data shared.

The sharing can take place among user entities being approved by one another. Further, the sharing can be facilitated by trusted and secure cloud functions to which only the user entities have access, promoting trustworthiness of the prediction processes.

Additionally, the prediction processes can be open box, such that explainability data providing reasoning for a prediction made can be presented and/or accessible to the user entities, thus promoting explainability.

Figure 6:
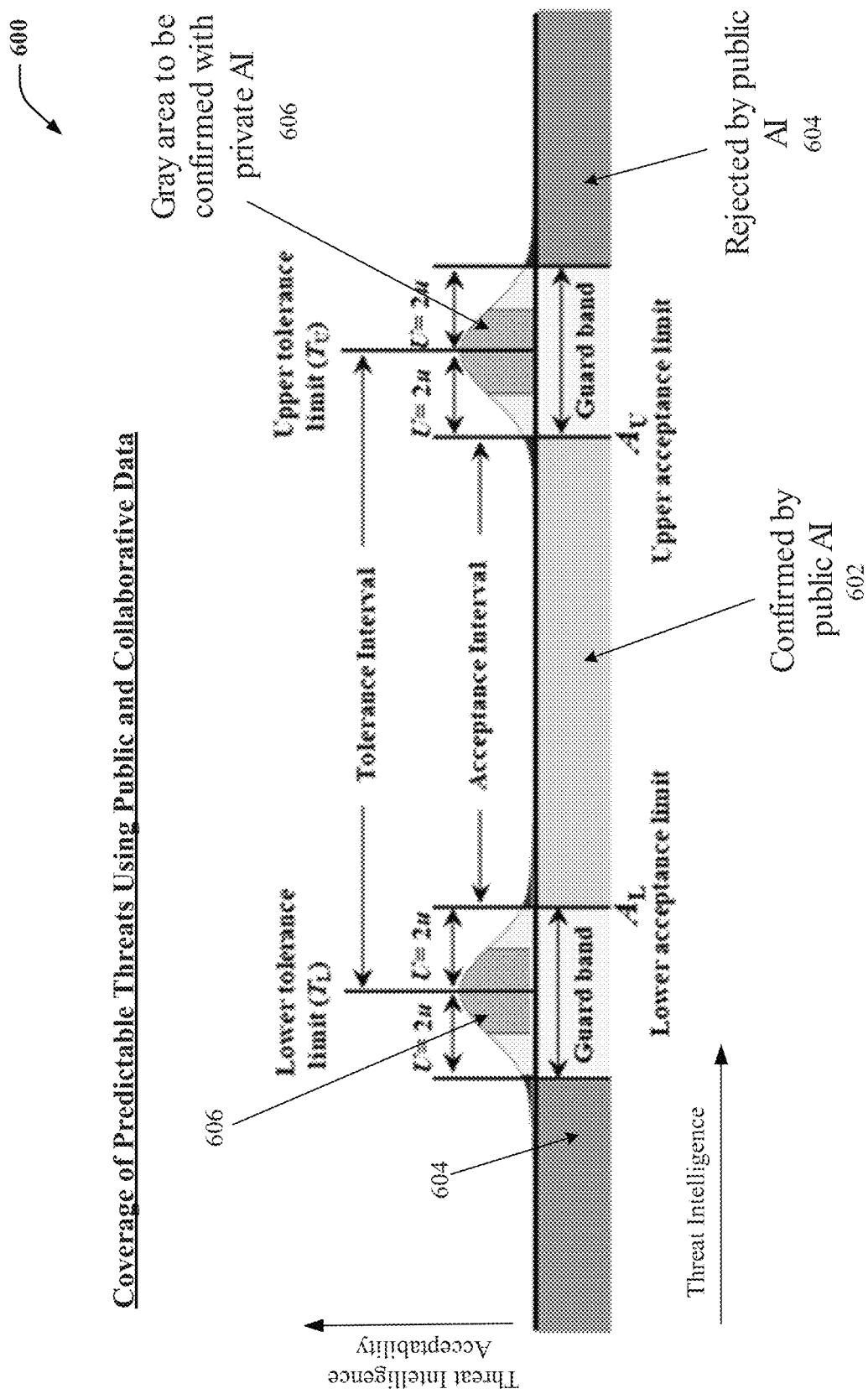
FIG. 6 depicts an exemplary graph illustrating tolerance limits applied to security threat intelligence data, in accordance with one or more embodiments described herein.

Turning next to FIGS. 6 and 7, additional examples of explainability data are illustrated. The graphs 600, 700 and 710 illustrate additional data and/or types of data displays that can be output as outputs 380, such as by the output component 322 to user entities of the security threat prediction system 302. Output can be by any suitable means, such as employing a cloud function accessible to the user entities.

FIG. 6 illustrates a graph 600 of coverage of predictable threats using both public and collaborative data. As illustrated, initial narrowing of data, such as using Bayesian reasoning, can be provided using only publicly-available data. Areas 604 at the outer left and right sides of the X-axis represent data that is rejected by a public-data-based AI (e.g., public analytical model 316). Area 602 in the center of the X-axis represents data that is accepted and/or confirmed by the public-data-based AI (e.g., public analytical model 316). However, using only public-available data leaves guard bands 606 of unconfirmed data, which can be desired to be known. Indeed, sophisticated actors can, understanding the publicly-available data, manipulate the publicly-available data and/or their respective actions to be defined by these gray areas (e.g., guard bands 606. It is the use of the proprietary data, in combination with the publicly-available data, by the one or more frameworks described herein, that can allow for increasing an acceptance interval where suitable.

It is noted that U and u can be assigned based on statistical defaults and/or user preferences.

FIG. 7 illustrates a pair of graphs 700 and 710. Graph 700 illustrates coverage of predictable threats using only publicly-available data. As shown at the identified box 702, few threat actors are identified as corresponding to the threat intelligence of the Y-axis. Differently, graph 710 illustrates coverage of predictable threats using both publicly-available data and collaborative data (e.g., shared proprietary data). As shown at the identified box 712, a much greater portion of threat actors are identified as corresponding to the threat intelligence of the Y-axis.

Figure 8:
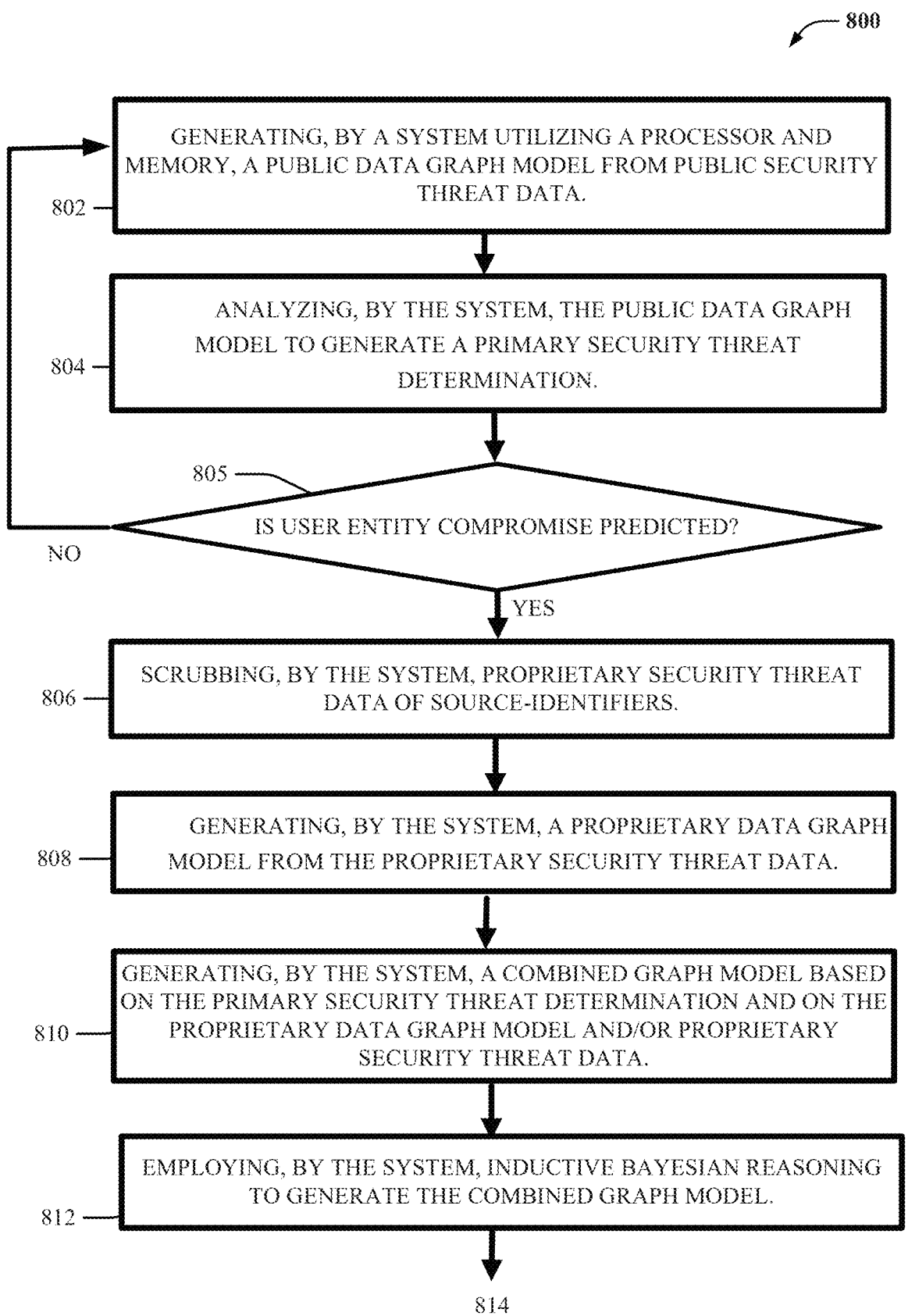
FIG. 8 illustrates a flow diagram of one or more processes that can be performed by and/or in connection with a security threat prediction system, in accordance with one or more embodiments described herein.
Figure 9:
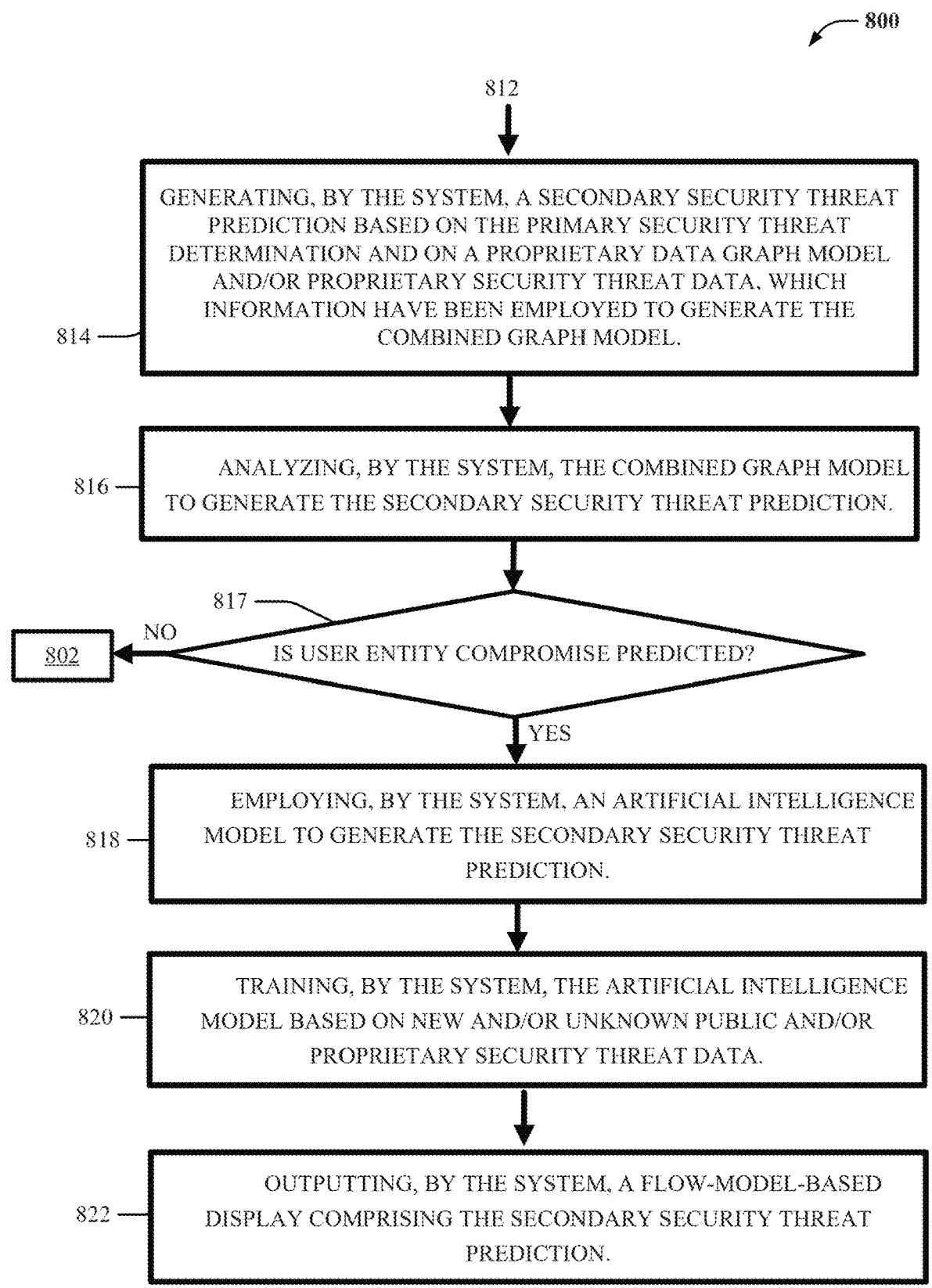
FIG. 9 illustrates a flow diagram of one or more processes that can be performed by and/or in connection with a security threat prediction system, in accordance with one or more embodiments described herein.

Referring next to FIGS. 8 and 9, illustrated is a flow diagram of an example, non-limiting method 800 that can provide a security threat prediction, in accordance with one or more embodiments described herein, such as the non-limiting system 300 of FIG. 3. The non-limiting method 800 begins at FIG. 8 and continues to FIG. 9.

While the non-limiting method 800 is described relative to the non-limiting system 300 of FIG. 3, the non-limiting method 800 can be applicable also to other systems described herein, such as the non-limiting system 100 of FIG. 1 or non-limiting system 200 of FIG. 2. Repetitive description of like elements and/or processes employed in respective embodiments is omitted for sake of brevity.

At 802, the non-limiting method 800 can comprise generating, by a system utilizing a processor and memory (e.g., modelling component 314), a public data graph model from public security threat data.

At 804, the non-limiting method 800 can comprise analyzing, by the system (e.g., prediction component 312), a public data graph model to obtain a primary security threat determination.

At 805, the non-limiting method 800 can comprise a decision, by the system (e.g., prediction component 312) of whether a user entity compromise has been predicted. If yes, the non-limiting method 800 can proceed to step 806. If no, the non-limiting method 800 also can proceed to step 806, since any prediction employing only publicly available data can be tainted, such as by a bad actor entity.

At 806, the non-limiting method 800 can comprise scrubbing, by the system (e.g., a processor of a user entity and/or by the modelling component 314), proprietary security threat data of source-identifiers.

At 808, the non-limiting method 800 can comprise generating, by the system (e.g., modelling component 314), a proprietary data graph model from the proprietary security threat data.

At 810, the non-limiting method 800 can comprise generating, by the system (e.g., modelling component 314), a combined graph model based on the primary security threat determination and on the proprietary data graph model and/or proprietary security threat data.

At 812, the non-limiting method 800 can comprise employing, by the system (e.g., modelling component 314), inductive Bayesian reasoning to generate the combined graph model.

At 814, the non-limiting method 800 can comprise generating, by the system (e.g., prediction component 312), a secondary security threat prediction based on the primary security threat determination and on a proprietary data graph model and/or proprietary security threat data, which information have been employed to generate the combined graph model.

At 816, the non-limiting method 800 can comprise analyzing, by the system (e.g., prediction component 312), the combined graph model to generate the secondary security threat prediction.

At 817, the non-limiting method 800 can comprise a decision, by the system (e.g., prediction component 312) of whether a user entity compromise has been predicted. If yes, the non-limiting method 800 can proceed to step 818. If no, the non-limiting method 800 can restart, such as proceeding to step 802.

At 818, the non-limiting method 800 can comprise employing, by the system (e.g., modelling component 314 and/or prediction component 312), an artificial intelligence model (e.g., analytical model 316 and/or 318) to generate the secondary security threat prediction.

At 820, the non-limiting method 800 can comprise training, by the system (e.g., training component 320), the artificial intelligence model (e.g., analytical model 316 and/or 318) based on new and/or unknown public and/or proprietary security threat data.

At 822, the non-limiting method 800 can comprise outputting, by the system (e.g., output component 322), a flow-model-based display (e.g., diagram 730) comprising the secondary security threat prediction.

For simplicity of explanation, the computer-implemented and non-computer-implemented methodologies provided herein are depicted and/or described as a series of acts. It is to be understood that the subject innovation is not limited by the acts illustrated and/or by the order of acts, for example acts can occur in one or more orders and/or concurrently, and with other acts not presented and described herein. Furthermore, not all illustrated acts can be utilized to implement the computer-implemented and non-computer-implemented methodologies in accordance with the described subject matter. In addition, the computer-implemented and non-computer-implemented methodologies could alternatively be represented as a series of interrelated states via a state diagram or events. Additionally, the computer-implemented methodologies described hereinafter and throughout this specification are capable of being stored on an article of manufacture for transporting and transferring the computer-implemented methodologies to computers. The term article of manufacture, as used herein, is intended to encompass a computer program accessible from any computer-readable device or storage media.

The systems and/or devices have been (and/or will be further) described herein with respect to interaction between one or more components. Such systems and/or components can include those components or sub-components specified therein, one or more of the specified components and/or sub-components, and/or additional components. Sub-components can be implemented as components communicatively coupled to other components rather than included within parent components. One or more components and/or sub-components can be combined into a single component providing aggregate functionality. The components can interact with one or more other components not specifically described herein for the sake of brevity, but known by those of skill in the art.

In summary, one or more systems, devices, computer program products and/or computer-implemented methods of use provided herein relate to generating a security threat prediction. A system can comprise a memory that stores computer executable components, and a processor that executes the computer executable components stored in the memory. The computer executable components can comprise a prediction component that analyzes a public data graph model to generate a primary security threat determination, wherein the prediction component can further generate a secondary security threat prediction based on the primary security threat determination and on a proprietary data graph model, wherein the proprietary data graph model comprises proprietary security threat data from a source, and wherein the proprietary security threat data has been scrubbed of source-identifiers. An obtaining component can obtain an agreement from the source to share the proprietary security threat data with another source that has access to the proprietary data graph model.

An advantage of the above-indicated system can be employing collaborative intelligence from both public and proprietary sources, that otherwise would not be available to a user entity, to predict a security threat to the user entity or to a system employed by the user entity. As used herein, a "user entity" can comprise a machine, device, component, hardware, software, smart device and/or human.

Another advantage of the above-indicated system can be ability to share, by the source, the proprietary data having been scrubbed of source-identifiers, such as where context can be shared among collaborating user entities (e.g., sources) employing the system, without sharing of source-identifiers.

Another advantage of the one or more systems, computer-implemented methods and/or computer program products described herein can be provision of a security threat prediction process that offers privacy, trustworthiness and explainability. That is, as indicated, proprietary data can be shared after having been scrubbed of source-identifying data, thus promoting privacy. Sharing can be among a group of user entities that have each agreed to share the proprietary data with one another, and the sharing can be facilitated by secure cloud functions among the user entities, thus promoting trustworthiness. Further, the prediction processes employed can provide reasoning underlying the prediction, such that an open box system can be employed for explainability understood by both the system itself and by the user entities employing the system, computer-implemented method and/or computer program product.

Indeed, in view of the one or more embodiments described herein, a practical application of the systems, computer-implemented methods and/or computer program products described herein can be ability to analyze public threat intelligence data from a public domain and from a private/proprietary domain and generate therefrom a prediction of a security threat to a user entity, such as where the security threat would not have been predicted (or as accurately predicted) employing security threat intelligence data from a public domain alone. This is a useful and practical application of computers, thus providing enhanced (e.g., improved and/or optimized) security-based operation of the hardware and/or software components of the user entity, and/or of a system employed by the user entity, in view of mitigation and/or preventive processes employed in response to the prediction. Overall, such computerized tools can constitute a concrete and tangible technical improvement in the fields of cybersecurity and cybersecurity threat prediction. Furthermore, one or more embodiments described herein can be employed in a real-world system based on the disclosed teachings. For example, one or more embodiments described herein can function with a computer system that can receive as input the public and proprietary security threat intelligence data, and can generate a security threat prediction along with various models demonstrating explainability of the prediction, such as by employing a system described herein.

Moreover, a system, computer program product and/or computer-implemented method described herein can be implemented in one or more domains to enable scaled security threat prediction. Indeed, use of a system as described herein can be scalable, such as where public and/or proprietary security threat intelligence data from plural domains can be analyzed, at least partially at a same time as one another. Additionally and/or alternatively, plural security threat predictions can be generated at least partially at a same time as one another, such as for one or even more user entities.

The systems and/or devices have been (and/or will be further) described herein with respect to interaction between one or more components. Such systems and/or components can include those components or sub-components specified therein, one or more of the specified components and/or sub-components, and/or additional components. Sub-components can be implemented as components communicatively coupled to other components rather than included within parent components. One or more components and/or sub-components can be combined into a single component providing aggregate functionality. The components can interact with one or more other components not specifically described herein for the sake of brevity, but known by those of skill in the art.

One or more embodiments described herein can be, inherently and/or inextricably tied to computer technology and cannot be implemented outside of a computing environment. For example, one or more processes performed by one or more embodiments described herein can more efficiently, and even more feasibly, provide program and/or program instruction execution, such as relative to cyber security threat detection and prediction, as compared to existing systems and/or techniques. Systems, computer-implemented methods and/or computer program products providing performance of these processes are of great utility in the fields of cybersecurity, and cannot be equally practicably implemented in a sensible way outside of a computing environment.

One or more embodiments described herein can employ hardware and/or software to solve problems that are highly technical, that are not abstract, and that cannot be performed as a set of mental acts by a human. For example, a human, or even thousands of humans, cannot efficiently, accurately and/or effectively automatically obtain, process and/or analyze security threat intelligence data, employ Bayesian reasoning and/or output security threat predictions and alerts as the one or more embodiments described herein can provide this process. Moreover, neither can the human mind nor a human with pen and paper conduct one or more of these processes, as conducted by one or more embodiments described herein.

In one or more embodiments, one or more of the processes described herein can be performed by one or more specialized computers (e.g., a specialized processing unit, a specialized classical computer, a specialized quantum computer, a specialized hybrid classical/quantum system and/or another type of specialized computer) to execute defined tasks related to the one or more technologies describe above. One or more embodiments described herein and/or components thereof can be employed to solve new problems that arise through advancements in technologies mentioned above, employment of quantum computing systems, cloud computing systems, computer architecture and/or another technology.

One or more embodiments described herein can be fully operational towards performing one or more other functions (e.g., fully powered on, fully executed and/or another function) while also performing one or more of the one or more operations described herein.

Figure 10:
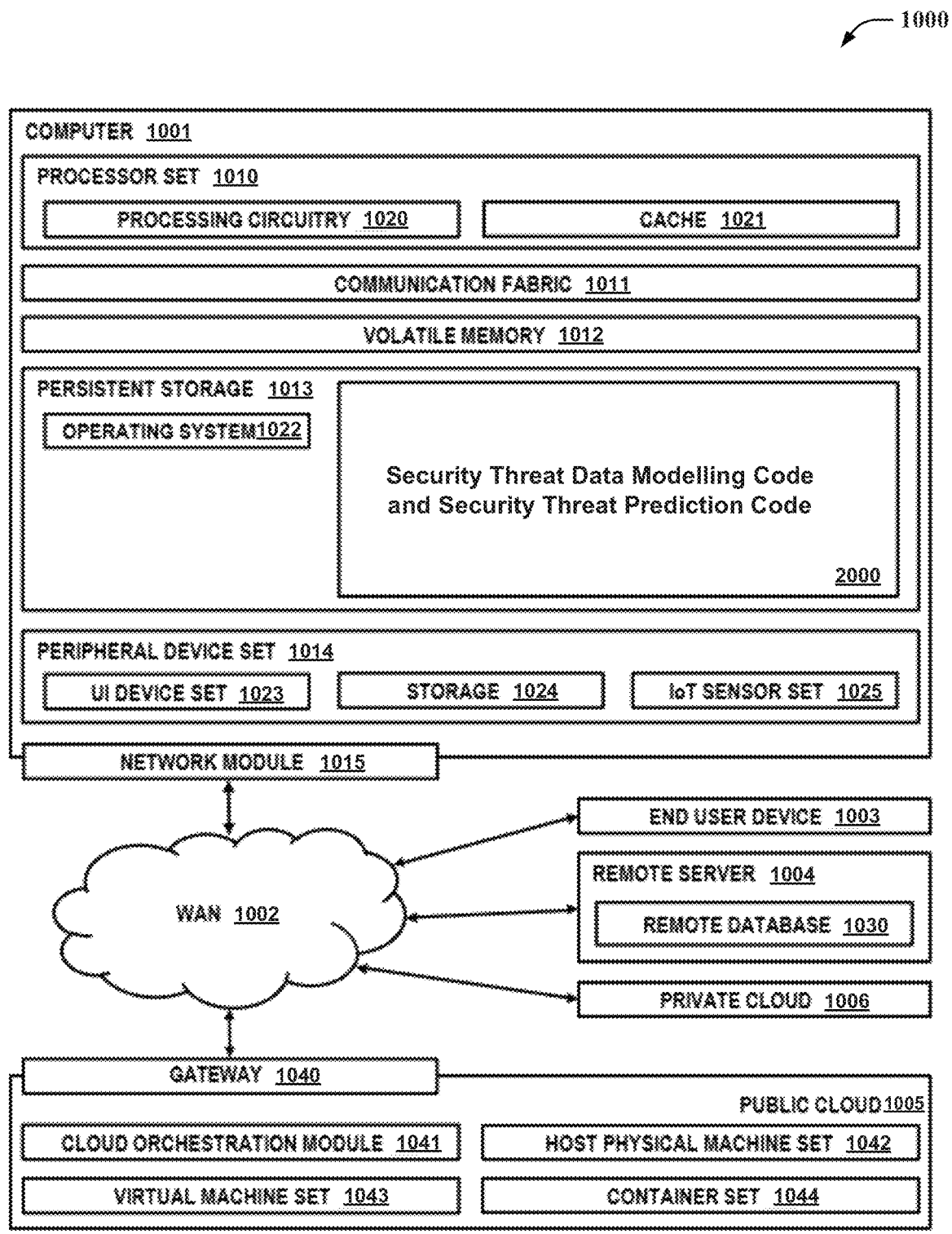
FIG. 10 illustrates a block diagram of example, non-limiting, computer environment in accordance with one or more embodiments described herein.

Turning next to FIG. 10, a detailed description is provided of additional context for the one or more embodiments described herein at FIGS. 1-9.

FIG. 10 and the following discussion are intended to provide a brief, general description of a suitable computing environment 1000 in which one or more embodiments described herein at FIGS. 1-9 can be implemented. For example, various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 1000 contains an example of an environment for the execution of at least some of the computer code involved in performing the inventive methods, such as translation of an original source code based on a configuration of a target system by the security threat data modelling code and security threat prediction code 2000. In addition to block 2000, computing environment 1000 includes, for example, computer 1001, wide area network (WAN) 1002, end user device (EUD) 1003, remote server 1004, public cloud 1005, and private cloud 1006. In this embodiment, computer 1001 includes processor set 1010 (including processing circuitry 1020 and cache 1021), communication fabric 1011, volatile memory 1012, persistent storage 1013 (including operating system 1022 and block 2000, as identified above), peripheral device set 1014 (including user interface (UI), device set 1023, storage 1024, and Internet of Things (IoT) sensor set 1025), and network module 1015. Remote server 1004 includes remote database 1030. Public cloud 1005 includes gateway 1040, cloud orchestration module 1041, host physical machine set 1042, virtual machine set 1043, and container set 1044.

COMPUTER 1001 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 1030. As is well understood in the art of computer technology, and depending upon the technology, performance of a computer-implemented method may be distributed among multiple computers and/or between multiple locations. On the other hand, in this presentation of computing environment 1000, detailed discussion is focused on a single computer, specifically computer 1001, to keep the presentation as simple as possible. Computer 1001 may be located in a cloud, even though it is not shown in a cloud in FIG. 10. On the other hand, computer 1001 is not required to be in a cloud except to any extent as may be affirmatively indicated.

PROCESSOR SET 1010 includes one, or more, computer processors of any type now known or to be developed in the future. Processing circuitry 1020 may be distributed over multiple packages, for example, multiple, coordinated integrated circuit chips. Processing circuitry 1020 may implement multiple processor threads and/or multiple processor cores. Cache 1021 is memory that is located in the processor chip package(s) and is typically used for data or code that should be available for rapid access by the threads or cores running on processor set 1010. Cache memories are typically organized into multiple levels depending upon relative proximity to the processing circuitry. Alternatively, some, or all, of the cache for the processor set may be located "off chip." In some computing environments, processor set 1010 may be designed for working with qubits and performing quantum computing.

Computer readable program instructions are typically loaded onto computer 1001 to cause a series of operational steps to be performed by processor set 1010 of computer 1001 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 1021 and the other storage media discussed below. The program instructions, and associated data, are accessed by processor set 1010 to control and direct performance of the inventive methods. In computing environment 1000, at least some of the instructions for performing the inventive methods may be stored in block 2000 in persistent storage 1013.

COMMUNICATION FABRIC 1011 is the signal conduction paths that allow the various components of computer 1001 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 1012 is any type of volatile memory now known or to be developed in the future. Examples include dynamic type random access memory (RAM) or static type RAM. Typically, the volatile memory is characterized by random access, but this is not required unless affirmatively indicated. In computer 1001, the volatile memory 1012 is located in a single package and is internal to computer 1001, but, alternatively or additionally, the volatile memory may be distributed over multiple packages and/or located externally with respect to computer 1001.

PERSISTENT STORAGE 1013 is any form of non-volatile storage for computers that is now known or to be developed in the future. The non-volatility of this storage means that the stored data is maintained regardless of whether power is being supplied to computer 1001 and/or directly to persistent storage 1013. Persistent storage 1013 may be a read only memory (ROM), but typically at least a portion of the persistent storage allows writing of data, deletion of data and re-writing of data. Some familiar forms of persistent storage include magnetic disks and solid state storage devices. Operating system 1022 may take several forms, such as various known proprietary operating systems or open source Portable Operating System Interface type operating systems that employ a kernel. The code included in block 2000 typically includes at least some of the computer code involved in performing the inventive methods.

PERIPHERAL DEVICE SET 1014 includes the set of peripheral devices of computer 1001. Data communication connections between the peripheral devices and the other components of computer 1001 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 1023 may include components such as a display screen, speaker, microphone, wearable devices (such as goggles and smart watches), keyboard, mouse, printer, touchpad, game controllers, and haptic devices. Storage 1024 is external storage, such as an external hard drive, or insertable storage, such as an SD card. Storage 1024 may be persistent and/or volatile. In some embodiments, storage 1024 may take the form of a quantum computing storage device for storing data in the form of qubits. In embodiments where computer 1001 is required to have a large amount of storage (for example, where computer 1001 locally stores and manages a large database) then this storage may be provided by peripheral storage devices designed for storing very large amounts of data, such as a storage area network (SAN) that is shared by multiple, geographically distributed computers. IoT sensor set 1025 is made up of sensors that can be used in Internet of Things applications. For example, one sensor may be a thermometer and another sensor may be a motion detector.

NETWORK MODULE 1015 is the collection of computer software, hardware, and firmware that allows computer 1001 to communicate with other computers through WAN 1002. Network module 1015 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 1015 are performed on the same physical hardware device. In other embodiments (for example, embodiments that utilize software-defined networking (SDN)), the control functions and the forwarding functions of network module 1015 are performed on physically separate devices, such that the control functions manage several different network hardware devices. Computer readable program instructions for performing the inventive methods can typically be downloaded to computer 1001 from an external computer or external storage device through a network adapter card or network interface included in network module 1015.

WAN 1002 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 1003 is any computer system that is used and controlled by an end user (for example, a customer of an enterprise that operates computer 1001), and may take any of the forms discussed above in connection with computer 1001. EUD 1003 typically receives helpful and useful data from the operations of computer 1001. For example, in a hypothetical case where computer 1001 is designed to provide a recommendation to an end user, this recommendation would typically be communicated from network module 1015 of computer 1001 through WAN 1002 to EUD 1003. In this way, EUD 1003 can display, or otherwise present, the recommendation to an end user. In some embodiments, EUD 1003 may be a client device, such as thin client, heavy client, mainframe computer, desktop computer and so on.

REMOTE SERVER 1004 is any computer system that serves at least some data and/or functionality to computer 1001. Remote server 1004 may be controlled and used by the same entity that operates computer 1001. Remote server 1004 represents the machine(s) that collect and store helpful and useful data for use by other computers, such as computer 1001. For example, in a hypothetical case where computer 1001 is designed and programmed to provide a recommendation based on historical data, then this historical data may be provided to computer 1001 from remote database 1030 of remote server 1004.

PUBLIC CLOUD 1005 is any computer system available for use by multiple entities that provides on-demand availability of computer system resources and/or other computer capabilities, especially data storage (cloud storage) and computing power, without direct active management by the scale. The direct and active management of the computing resources of public cloud 1005 is performed by the computer hardware and/or software of cloud orchestration module 1041. The computing resources provided by public cloud 1005 are typically implemented by virtual computing environments that run on various computers making up the computers of host physical machine set 1042, which is the universe of physical computers in and/or available to public cloud 1005. The virtual computing environments (VCEs) typically take the form of virtual machines from virtual machine set 1043 and/or containers from container set 1044. It is understood that these VCEs may be stored as images and may be transferred among and between the various physical machine hosts, either as images or after instantiation of the VCE. Cloud orchestration module 1041 manages the transfer and storage of images, deploys new instantiations of VCEs and manages active instantiations of VCE deployments. Gateway 1040 is the collection of computer software, hardware, and firmware that allows public cloud 1005 to communicate through WAN 1002.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 1006 is similar to public cloud 1005, except that the computing resources are only available for use by a single enterprise. While private cloud 1006 is depicted as being in communication with WAN 1002, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 1005 and private cloud 1006 are both part of a larger hybrid cloud.

The embodiments described herein can be directed to one or more of a system, a method, an apparatus and/or a computer program product at any possible technical detail level of integration. The computer program product can include a computer readable storage medium (or media) having computer readable program instructions thereon for causing a processor to carry out aspects of the one or more embodiments described herein. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a superconducting storage device and/or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon and/or any suitable combination of the foregoing. A computer readable storage medium, as used herein, is not to be construed as being transitory signals per se, such as radio waves and/or other freely propagating electromagnetic waves, electromagnetic waves propagating through a waveguide and/or other transmission media (e.g., light pulses passing through a fiber-optic cable), and/or electrical signals transmitted through a wire.

Computer readable program instructions described herein can be downloaded to respective computing/processing devices from a computer readable storage medium and/or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the one or more embodiments described herein can be assembler instructions, instruction-set-architecture (ISA) instructions, machine instructions, machine dependent instructions, microcode, firmware instructions, state-setting data, configuration data for integrated circuitry, and/or source code and/or object code written in any combination of one or more programming languages, including an object oriented programming language such as Smalltalk, C++ or the like, and/or procedural programming languages, such as the "C" programming language and/or similar programming languages. The computer readable program instructions can execute entirely on a computer, partly on a computer, as a stand-alone software package, partly on a computer and/or partly on a remote computer or entirely on the remote computer and/or server. In the latter scenario, the remote computer can be connected to a computer through any type of network, including a local area network (LAN) and/or a wide area network (WAN), and/or the connection can be made to an external computer (for example, through the Internet using an Internet Service Provider). In one or more embodiments, electronic circuitry including, for example, programmable logic circuitry, field-programmable gate arrays (FPGA) and/or programmable logic arrays (PLA) can execute the computer readable program instructions by utilizing state information of the computer readable program instructions to personalize the electronic circuitry, in order to perform aspects of the one or more embodiments described herein.

Aspects of the one or more embodiments described herein are described with reference to flowchart illustrations and/or block diagrams of methods, apparatus (systems), and computer program products according to one or more embodiments described herein. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer and/or other programmable data processing apparatus to produce a machine, such that the instructions, which execute via the processor of the computer or other programmable data processing apparatus, can create means for implementing the functions/acts specified in the flowchart and/or block diagram block or blocks. These computer readable program instructions can also be stored in a computer readable storage medium that can direct a computer, a programmable data processing apparatus and/or other devices to function in a particular manner, such that the computer readable storage medium having instructions stored therein can comprise an article of manufacture including instructions which can implement aspects of the function/act specified in the flowchart and/or block diagram block or blocks. The computer readable program instructions can also be loaded onto a computer, other programmable data processing apparatus and/or other device to cause a series of operational acts to be performed on the computer, other programmable apparatus and/or other device to produce a computer implemented process, such that the instructions which execute on the computer, other programmable apparatus and/or other device implement the functions/acts specified in the flowchart and/or block diagram block or blocks.

The flowcharts and block diagrams in the figures illustrate the architecture, functionality and/or operation of possible implementations of systems, computer-implementable methods and/or computer program products according to one or more embodiments described herein. In this regard, each block in the flowchart or block diagrams can represent a module, segment and/or portion of instructions, which comprises one or more executable instructions for implementing the specified logical function(s). In one or more alternative implementations, the functions noted in the blocks can occur out of the order noted in the Figures. For example, two blocks shown in succession can be executed substantially concurrently, and/or the blocks can sometimes be executed in the reverse order, depending upon the functionality involved. It will also be noted that each block of the block diagrams and/or flowchart illustration, and/or combinations of blocks in the block diagrams and/or flowchart illustration, can be implemented by special purpose hardware-based systems that can perform the specified functions and/or acts and/or carry out one or more combinations of special purpose hardware and/or computer instructions.

While the subject matter has been described above in the general context of computer-executable instructions of a computer program product that runs on a computer and/or computers, those skilled in the art will recognize that the one or more embodiments herein also can be implemented in combination with one or more other program modules. Generally, program modules include routines, programs, components, data structures and/or the like that perform particular tasks and/or implement particular abstract data types. Moreover, the aforedescribed computer-implemented methods can be practiced with other computer system configurations, including single-processor and/or multiprocessor computer systems, mini-computing devices, mainframe computers, as well as computers, hand-held computing devices (e.g., PDA, phone), microprocessor-based or programmable consumer and/or industrial electronics and/or the like. The illustrated aspects can also be practiced in distributed computing environments in which tasks are performed by remote processing devices that are linked through a communications network. However, one or more, if not all aspects of the one or more embodiments described herein can be practiced on stand-alone computers. In a distributed computing environment, program modules can be located in both local and remote memory storage devices.

As used in this application, the terms "component," "system," "platform," "interface," and/or the like, can refer to and/or can include a computer-related entity or an entity related to an operational machine with one or more specific functionalities. The entities described herein can be either hardware, a combination of hardware and software, software, or software in execution. For example, a component can be, but is not limited to being, a process running on a processor, a processor, an object, an executable, a thread of execution, a program and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system and/or across a network such as the Internet with other systems via the signal). As another example, a component can be an apparatus with specific functionality provided by mechanical parts operated by electric or electronic circuitry, which is operated by a software and/or firmware application executed by a processor. In such a case, the processor can be internal and/or external to the apparatus and can execute at least a part of the software and/or firmware application. As yet another example, a component can be an apparatus that provides specific functionality through electronic components without mechanical parts, where the electronic components can include a processor and/or other means to execute software and/or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter described herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit and/or device comprising, but not limited to, single-core processors; single-processors with software multithread execution capability; multi-core processors; multi-core processors with software multithread execution capability; multi-core processors with hardware multithread technology; parallel platforms; and/or parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, and/or any combination thereof designed to perform the functions described herein. Further, processors can exploit nano-scale architectures such as, but not limited to, molecular and quantum-dot based transistors, switches and/or gates, in order to optimize space usage and/or to enhance performance of related equipment. A processor can be implemented as a combination of computing processing units.

Herein, terms such as "store," "storage," "data store," data storage," "database," and substantially any other information storage component relevant to operation and functionality of a component are utilized to refer to "memory components," entities embodied in a "memory," or components comprising a memory. Memory and/or memory components described herein can be either volatile memory or nonvolatile memory or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory and/or nonvolatile random access memory (RAM) (e.g., ferroelectric RAM (FeRAM). Volatile memory can include RAM, which can act as external cache memory, for example. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM) and/or Rambus dynamic RAM (RDRAM). Additionally, the described memory components of systems and/or computer-implemented methods herein are intended to include, without being limited to including, these and/or any other suitable types of memory.

What has been described above includes mere examples of systems and computer-implemented methods. It is, of course, not possible to describe every conceivable combination of components and/or computer-implemented methods for purposes of describing the one or more embodiments, but one of ordinary skill in the art can recognize that many further combinations and/or permutations of the one or more embodiments are possible. Furthermore, to the extent that the terms "includes," "has," "possesses," and the like are used in the detailed description, claims, appendices and/or drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments described herein. Many modifications and variations will be apparent to those of ordinary skill in the art without departing from the scope and spirit of the described embodiments. The terminology used herein was chosen to best explain the principles of the embodiments, the practical application and/or technical improvement over technologies found in the marketplace, and/or to enable others of ordinary skill in the art to understand the embodiments described herein.

The invention claimed is:

1. A system, comprising:
   a memory that stores computer executable components; and
   a processor that executes the computer executable components stored in the memory, wherein the computer executable components comprise:
   a prediction component that analyzes a public data graph model to generate a primary security threat determination,
   wherein the prediction component further generates a secondary security threat prediction based on the primary security threat determination and on a proprietary data graph model,
   wherein the proprietary data graph model comprises proprietary security threat data from a source, and wherein the proprietary security threat data has been scrubbed of source-identifiers.

2. The system of claim 1, further comprising:
   an obtaining component that obtains an agreement from the source to share the proprietary security threat data, having been scrubbed of the source-identifiers, with another source that has access to the proprietary data graph model.

3. The system of claim 1, wherein the proprietary security threat data that has been scrubbed comprises, or has related thereto, a probability distribution that is employed to generate the proprietary data graph model which is based on the proprietary security threat data.

4. The system of claim 1, further comprising:
   a modelling component that generates the public graph model based on public security threat data, and that generates the proprietary graph model based on the proprietary security threat data.

5. The system of claim 1, further comprising:
   a modelling component that generates a combined graph model based on the primary security threat determination and on the proprietary data graph model,
   wherein the prediction component further analyzes the combined graph model to generate the secondary security threat prediction.

6. The system of claim 5, wherein the modelling component generates the combined graph model by employing inductive Bayesian reasoning.

7. The system of claim 1, further comprising:
   an output component that outputs a flow-model-based display comprising the secondary security threat prediction.

8. A computer-implemented method, comprising:
   analyzing, by a system utilizing a processor and memory, a public data graph model to generate a primary security threat determination; and
   generating, by the system, a secondary security threat prediction based on the primary security threat determination and on a proprietary data graph model,
   wherein the proprietary data graph model comprises proprietary security threat data from a source, and wherein the proprietary security threat data has been scrubbed of source-identifiers.

9. The computer-implemented method of claim 8, further comprising:
   obtaining, by the system, an agreement from the source to share the proprietary security threat data, having been scrubbed of the source-identifiers, with another source that has access to the proprietary data graph model.

10. The system of claim 8, wherein the proprietary security threat data that has been scrubbed comprises, or has related thereto, a probability distribution that is employed to generate the proprietary data graph model which is based on the proprietary security threat data.

11. The computer-implemented method of claim 8, further comprising:
    generating, by the system, the public graph model based on public security threat data; and
    generating, by the system, the proprietary graph model based on the proprietary security threat data.

12. The computer-implemented method of claim 8, further comprising:
    generating, by the system, a combined graph model based on the primary security threat determination and on the proprietary data graph model; and
    analyzing, by the system, the combined graph model to generate the secondary security threat prediction.

13. The computer-implemented method of claim 12, wherein the combined graph model is generated, by the system, employing inductive Bayesian reasoning.

14. The computer-implemented method of claim 8, further comprising:
    outputting, by the system, a flow-model based display comprising the secondary security threat prediction; and
    employing, by the system, an artificial intelligence model to generate the secondary security threat prediction.

15. A computer program product facilitating a process to generate a security threat prediction, the computer program product comprising a computer readable storage medium having program instructions embodied therewith, the program instructions executable by a processor to cause the processor to:
    analyze, by the processor, a public data graph model to generate a primary security threat determination; and
    generate, by the processor, a secondary security threat prediction based on the primary security threat determination and on a proprietary data graph model,
    wherein the proprietary data graph model comprises proprietary security threat data from a source, and wherein the proprietary security threat data has been scrubbed of source-identifiers.

16. The computer program product of claim 15, wherein the program instructions are further executable by the processor to cause the processor to:
    obtain, by the processor, an agreement from the source to share the proprietary security threat data, having been scrubbed of the source-identifiers, with another source that has access to the proprietary data graph model.

17. The system of claim 15, wherein the proprietary security threat data that has been scrubbed comprises, or has related thereto, a probability distribution that is employed to generate the proprietary data graph model which is based on the proprietary security threat data.

18. The computer program product of claim 15, wherein the program instructions are further executable by the processor to cause the processor to:
    generate, by the processor, the public graph model based on public security threat data; and
    generate, by the processor, the proprietary graph model based on the proprietary security threat data.

19. The computer program product of claim 15, wherein the program instructions are further executable by the processor to cause the processor to:
    generate, by the processor, a combined graph model based on the primary security threat determination and on the proprietary data graph model; and analyze, by the processor, the combined graph model to generate the secondary security threat prediction.

20. The computer program product of claim 19, wherein the combined graph model is generated, by the processor, employing inductive Bayesian reasoning, and
wherein the program instructions are further executable by the processor to cause the processor to employ, by the processor, an artificial intelligence model to generate the secondary security threat prediction.

* * * * *